(12) United States Patent
Tocchetto et al.

(10) Patent No.: US 12,194,412 B2
(45) Date of Patent: Jan. 14, 2025

(54) AIR CONDITIONING SYSTEMS BASED ON MEMBRANES

(71) Applicant: Notark Corporation, Houston, TX (US)

(72) Inventors: Roger Tocchetto, Houston, TX (US); Vijay Mhetar, Houston, TX (US); Richard Blackwell, Houston, TX (US); Lee Barnes, Houston, TX (US)

(73) Assignee: NOTARK CORPORATION, The Woodlands, TX (US)

( * ) Notice: Subject to any disclaimer, the term of this patent is extended or adjusted under 35 U.S.C. 154(b) by 338 days.

(21) Appl. No.: 17/754,326

(22) PCT Filed: Oct. 12, 2020

(86) PCT No.: PCT/US2020/070655
§ 371 (c)(1),
(2) Date: Mar. 30, 2022

(87) PCT Pub. No.: WO2021/072448
PCT Pub. Date: Apr. 15, 2021

(65) Prior Publication Data
US 2022/0387927 A1 Dec. 8, 2022

Related U.S. Application Data

(60) Provisional application No. 62/966,011, filed on Jan. 26, 2020, provisional application No. 62/935,305, (Continued)

(51) Int. Cl.
*B01D 53/22* (2006.01)
*B01D 53/26* (2006.01)
(Continued)

(52) U.S. Cl.
CPC ......... *B01D 53/228* (2013.01); *B01D 53/268* (2013.01); *B01D 63/02* (2013.01);
(Continued)

(58) Field of Classification Search
CPC ...... B01D 61/44; B01D 61/46; B01D 61/445; B01D 71/28; B01D 71/68; B01D 71/80;
(Continued)

(56) References Cited

U.S. PATENT DOCUMENTS 4,217,421 A * 8/1980 Beasley .................. B01J 41/14
521/32
4,221,642 A * 9/1980 De Nora ................ C08J 5/2243
204/252

(Continued)

FOREIGN PATENT DOCUMENTS

CN 206563376 U 10/2017
DE 102008022731 A1 11/2009
(Continued)

OTHER PUBLICATIONS

H.T.El-Dessouky, "A Novel Air Conditioning System Membrane Air Drying and Evaporative Cooling", Institution of Chemical Engineers, pp. 999-1009.

*Primary Examiner* — Minh Chau T Pham

(57) ABSTRACT

An air conditioning (AC) system is provided, employing a sulfonated copolymer (SC) layer as a selectively permeable and ion exchanging membrane. The sulfonated block copolymer has an IEC greater than 0.5 meq/g. In embodiments, the sulfonated block copolymer is used to form the membrane itself, or bonded/coated onto a membrane or a foam. In embodiments, the AC employs a membrane electrode assembly, i.e., using electric field across a membrane in a dehumidifier to transport moisture generating a dry air stream, along with an evaporative cooler for latent heat removal via evaporation induced cooling of the dry air (Continued)

stream from the dehumidifier. The system operates as a closed loop wherein the room air after cooling is recycled or loop back to the dehumidifying membrane electrode assembly to generate dry air for the evaporative cooler, generating conditioned air.

18 Claims, 17 Drawing Sheets

Related U.S. Application Data filed on Nov. 14, 2019, provisional application No. 62/913,421, filed on Oct. 10, 2019.

(51) Int. Cl.
*B01D 63/02* (2006.01)
*B01D 71/76* (2006.01)
*B60H 3/00* (2006.01)
*B60H 3/06* (2006.01)
*F24F 3/14* (2006.01)
*F24F 5/00* (2006.01)

(52) U.S. Cl.
CPC ................ *B01D 71/76* (2013.01); *F24F 3/14* (2013.01); *B01D 2259/4508* (2013.01); *B01D 2325/48* (2013.01); *F24F 2003/1435* (2013.01)

(58) Field of Classification Search
CPC .. B01D 53/22; B60H 1/00; B60H 1/32; C02F 297/02; C02F 1/441; C02F 1/445; C02F 1/4693; C02F 1/4695; H01M 8/1018
USPC ........ 204/631, 632; 442/59, 152; 525/332.9; 521/27
See application file for complete search history.

(56) References Cited

U.S. PATENT DOCUMENTS

| | | | |
|---|---|---|---|
| 2007/0021569 A1* | 1/2007 | Willis | B01D 71/261 525/314 |
| 2007/0259237 A1* | 11/2007 | Kormann | H01M 8/04029 429/492 |
| 2009/0123804 A1* | 5/2009 | Yamashita | H01M 4/926 429/494 |
| 2012/0117987 A1* | 5/2012 | Claridge | B01D 53/268 62/271 |
| 2013/0015071 A1* | 1/2013 | Willis | B01D 71/80 204/632 |
| 2014/0027528 A1 | 1/2014 | Attey | |
| 2014/0157985 A1* | 6/2014 | Scovazzo | B01D 53/22 95/52 |
| 2014/0260369 A1 | 9/2014 | LePoudre | |
| 2014/0260371 A1 | 9/2014 | Vandermeulen | |
| 2015/0292797 A1 | 10/2015 | Fan et al. | |
| 2018/0142129 A1 | 5/2018 | Yamamoto et al. | |
| 2019/0113247 A1 | 4/2019 | Lepoudre et al. | |

FOREIGN PATENT DOCUMENTS

| | | |
|---|---|---|
| JP | H01224027 A | 9/1989 |
| JP | H01236919 A | 9/1989 |
| JP | H01274824 A | 11/1989 |
| JP | 2004351316 A | 12/2004 |
| JP | 5581266 B2 | 7/2014 |
| KR | 20020027022 A | 4/2002 |
| WO | 2018161711 A1 | 9/2018 |

* cited by examiner

PLATE TOP VIEW

AIR CONDITIONING SYSTEMS BASED ON MEMBRANES

CROSS-REFERENCE TO RELATED APPLICATIONS

This application claims priority from U.S. Provisional Application No. 62/913,421 with a filing date of Oct. 10, 2019, 62/935,305 with a filing date of Nov. 14, 2019, and 62/966,011 with a filing date of Jan. 26, 2020, the entire disclosures are incorporated herein by reference.

TECHNICAL FIELD

The disclosure relates to air conditioners and air dehumidifiers containing a sulfonate copolymer membrane.

BACKGROUND

Conventional coolers based on heat removal by water evaporation are of two kinds: (1) large cooling towers to cool large spaces, providing indirect evaporative cooling and cannot be readily scaled down due to infrastructure size requirements, and (2) desert coolers which provide direct evaporative cooling via humidifying the surrounding environment, which do not work well in high humidity environments due to humidity saturation issues.

Conventional refrigerant based air conditioners (A/C) provide indirect cooling via heat exchange of process air with a cyclical refrigerant condensation and evaporation cycle. The AC are inefficient because of the water condensation resulting for the process air temperature reduction, countering the cooling efficiency of the system with the heat of water condensation. Dehumidification is in many cases the primary function of refrigerant based systems, which in many cases include an air heating cycle after the dehumidification step, to regulate dispensed air temperature, further reducing system efficiency.

Prior art dehumidification systems based on desiccant wheels or refrigeration cycles have extremely high energy requirements for dehumidifying humid air, regenerating the desiccant, and running the refrigeration cycle.

As climate change creates various environmental challenges, especially with rising air conditioning demand, there is a need for more energy efficient air conditioners for cooling and dehumidifying homes, offices, factories, etc. as the current state of technology is energy intensive which results in high carbon emissions at the energy generation level.

SUMMARY

In one aspect, the disclosure relates to an AC system comprising either a dehumidifying unit or an evaporative cooling unit, or both, in which the dehumidifier and evaporative cooling units comprise a selectively permeable and ion exchanging polymer based membrane assembly. The membrane assembly may comprise primarily, if not entirely from, sulfonated copolymer (SC) or may be prepared as an SC-based composite material that includes other materials such as foam. The SC preferably has an IEC greater than 0.5 meq/g. In embodiments, the humidification unit employs a membrane electrode assembly (MEA) that includes a pair of electrodes. The application of voltage across the MEA allows air moisture to diffuse from the inlet side to the outlet side of the MEA. Since the selectively permeable and ion exchanging polymer based membrane is permeable to air moisture but not to the other air components, dehumidified air is generated after the MEA extracts the moisture from the humid air. The evaporative cooling unit's selectively permeable and ion exchanging polymer based membrane functions as a water evaporation medium, wherein the water molecules present in the membrane evaporate as they absorb the latent heat from passing warm air, which leads to the cooling of the air stream. The air conditioning system operates as a closed loop, wherein the room air is loops back into the dehumidifying and evaporative cooling units to undergo another round of cooling and dehumidification.

The evaporative cooling unit includes the following: an air intake; one or more selectively water permeable and high ion exchange capacity membrane assemblies; a water source for providing water to the membranes that serve as an evaporation medium; one or more fans with fan blades that may be coated with a selectively permeable membrane; and an air return. The dehumidification unit includes the following: one or more selectively water permeable and high ion exchange capacity membrane; a pair of electrodes positioned at two opposite sides of the membrane; a power source for generating a voltage across the electrodes; and a dehumidified air return. The dehumidification unit may be used for dehumidifying air with a relative humidity (RH) of at least 10%. The electrodes may incorporate materials including metals, metal oxides, organometallic compounds, as well as inorganic and organic compounds. The electrodes may also comprise one or more particles or components in the form of, for example, carbon cloth, woven and non-woven conducting materials, nanotubes, nanosheets, nanoparticles.

In another aspect, the selectively water permeable and high ion exchange capacity membrane allows proton-exchange across the membrane and has an ion exchange capacity greater than 0.5 meq/g. The membrane may include one or more SC layers with thickness between about 5 micron to about 500 microns. In other embodiments, the SC may have a sulfonation degree of at least 25%. In certain embodiments, the membrane is made primarily of at least one type of sulfonated polymer or copolymer. The membrane may provide antibacterial properties.

In embodiments, the sulfonated copolymers can have any of the following configurations: A-B-D-B-A, A-D-B-D-A, $(A-D-B)_nA$, $(A-B-D)_nA$, $(A-B-D)_nX$, and $(A-D-B)_nX$. The A-block preferably contains essentially no sulfonic acid or sulfonate ester functional groups and is selected from one or more of the following polymer units: (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof, wherein n is an integer from 2 to about 30, and X is a coupling agent residue.

The B-block may contain from about 10 to about 100 mol percent sulfonic acid or sulfonate ester functional groups based on the number of monomer units and comprises segments of one or more polymerized vinyl aromatic monomers, wherein n is an integer from 2 to about 30, and wherein X is a coupling agent residue. The block D may comprise a hydrogenated polymer or copolymer of a conjugated diene selected from isoprene, and 1,3-butadiene and mixtures thereof, wherein n is an integer that ranges from 2 to about 30, and X is a coupling agent residue.

Alternative selectively permeable ion exchanging materials which could be used in this application include perfluorinated and sulfonated polymers, or sulfonated block polymers with the (A-B-A)n configuration.

The evaporative cooling component of the air conditioner may be surface coated with a selectively permeable material such as a sulfonated styrenic block copolymer with selectively hydrophilic properties which display sensibly higher enthalpy of evaporation compared against that of free water, promoting greater temperature reduction of passing air per unit of water mass evaporated. This surface coating can be applied over traditional evaporative cooling media via spray, dip, paint or cast processes, or alternatively the coating can be applied over an especially designed fan with water supply within the fan blades surface.

DETAILED DESCRIPTION

Figure 1:
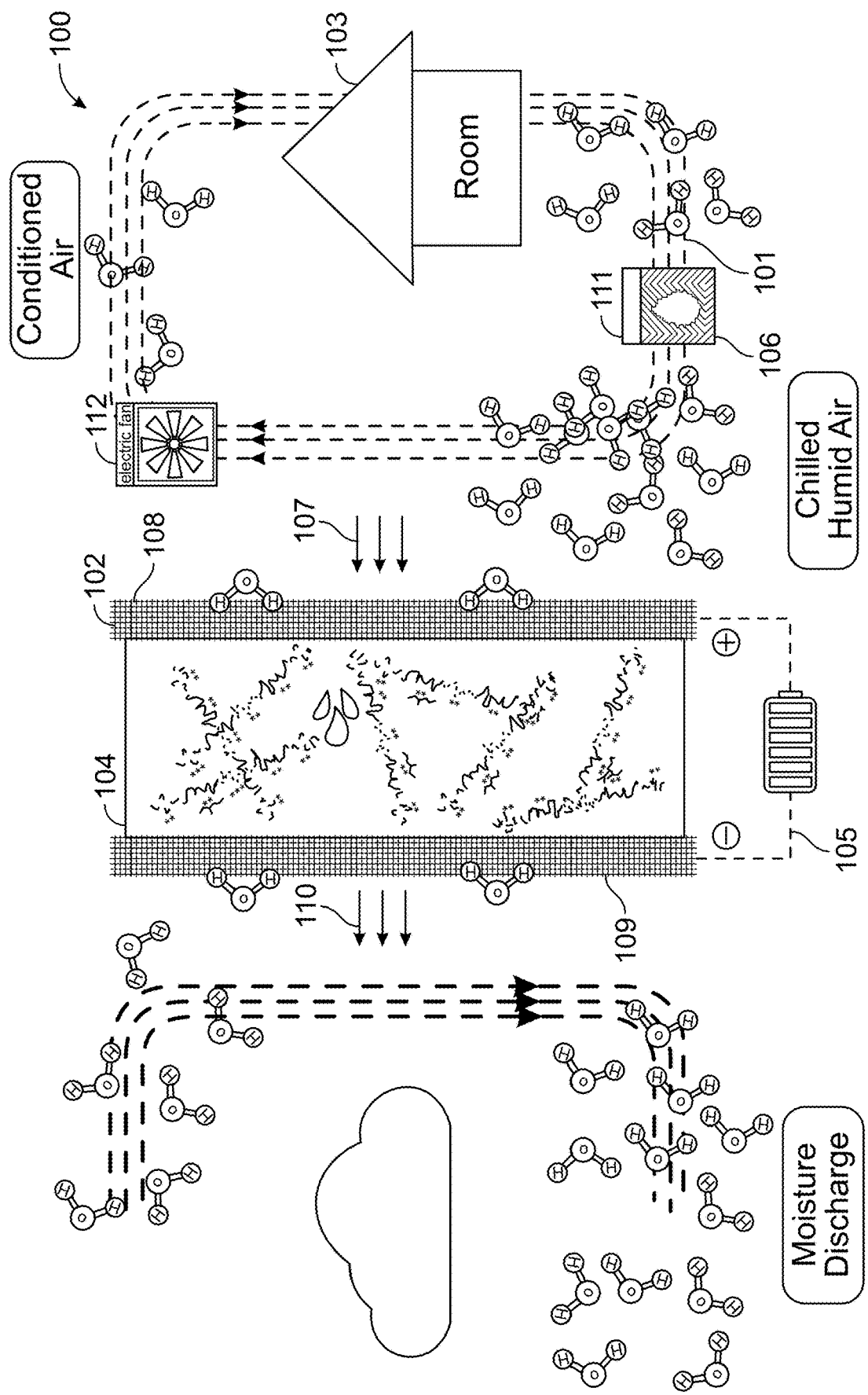
FIG. 1 is a schematic diagram of an embodiment of an air conditioning system.

The following terms will be used throughout the specification:

"Air conditioner" or "air conditioning system" and the like refers to a system for controlling the humidity, temperature, air flow rate, etc. of the air in an enclosed space such as a building, room, vehicle, etc. that require dehumidification or cooling. The term "air conditioning system" may be used to refer to HVAC system, "cooling unit", "cooling system," "cooler," "humidity control system," "integrated dehumidification and cooling system," etc.

Dehumidifier may be used interchangeably with dehumidification unit.

Moisture vapor transmission rate (MVTR) is a measure of flux, or the passage of water vapor through a substrate or the permeability of a substrate that is permeable to at least one fluid component but not to other components. MVTR is typically expressed in $g/m^2/day$ or $liter/m^2/day$. ASTM E-96B and ASTM F1249 specify standard methods for measuring MVTR.

"Humid" or "humid air" generally refers to air having a relative humidity (RH) of >50%, or preferably >60%, although the term "humid" may also be used in a relative sense to characterize air having an RH level that requires some degree of dehumidification. For example, air with an RH value below 50% may be considered "humid air" for spaces that require very low humidity levels, such as a storage room used for storing moisture-sensitive materials.

"Membrane" may be used interchangeably with "film" and includes selectively permeable and ion exchanging materials, e.g., films, coatings, foam or any planar structure that possess specific properties, such as hydrophilicity and air moisture permeability while being substantially impermeable to other air components and entrained air particles that make them suitable dehumidification and cooling medium for various types of air conditioning systems. The term "membrane" may also refer to a membrane bundle, membrane stack or an assembly of hollow fibers, plurality of membrane layers, or a composite substrate comprising two or more types of materials at least one of which is a selectively water permeable, ion exchanging material.

"Sulfonated copolymer membrane" or "SC-based membrane" or SC membrane refers to a membrane comprising at least one type of sulfonated copolymer (SC), a membrane comprising SC as the primary substrate material, or a membrane prepared from SC. SC may be incorporated into a membrane, hybrid membrane, or composite membrane assembly by various means such as coating or laminating an outer or inner surface of a membrane (e.g., the hollow inner core of hollow membrane fibers or microfibers) with an SC layer or film, or by bonding or inserting one or more SC layers in a membrane assembly or composite membrane comprising multiple layers prepared using different porous materials or different types of SC-layers.

"Membrane electrode assembly" (MEA) refers to a membrane assembly comprising at least a membrane and a pair of electrodes, as well as other components such as sulfonated copolymer, membrane frame, metal or nonmetal particles, catalyst, nanoparticles, graphene sheets, etc. that facilitate or allow a net diffusion of fluids such as vapor or gas through the membrane when a voltage is applied across the electrodes.

"Ion Exchange Capacity" or IEC refers to the total active sites or functional groups responsible for ion exchange in polymer electrolyte membranes. Generally, a conventional acid-base titration method is used to determine the IEC, see for example International Journal of Hydrogen Energy, Volume 39, Issue 10, Mar. 26, 2014, Pages 5054-5062, "Determination of the ion exchange capacity of anion-selective membrane."

"Vacuum" or "under vacuum" generally refers to a section of an air conditioning system with a pressure below atmospheric pressure. The term "vacuum" or "under vacuum" may also refer to a side of, for example, a membrane, membrane assembly, or MEA, or a section of the air conditioning system that has a lower pressure relative to another or opposite side or section.

The disclosure relates to an air conditioning (AC) system comprising a dehumidification unit and an evaporative cooling unit. The AC employs selectively water permeable and ion exchanging polymer based membranes for dehumidification. In embodiments, the selectively water permeable and ion exchanging polymer based membranes are also used for evaporative cooling systems based on cooling by water evaporation. The membranes comprise sulfonated copolymers (SC). In embodiments, the SC-based membranes are used in a dehumidifier membrane electrode assembly (MEA) for dehumidification. The MEA employs an electric field across the SC-based membrane to extract and remove water vapor from a relatively humid air circulating inside an enclosed structure, e.g., a room, facility, or building.

Sulfonated Copolymer for Use in Membrane: The membrane as used in the AC system is characterized has having favorable ion-exchange capacity and proton conductivity, and glass transition temperature, providing both flexibility and material strength, and good stability and swelling properties even when hydrated. The membrane is formed mostly or substantially entirely from a sulfonated copolymer being sufficiently sulfonated to contain from 10-100 mol % sulfonic acid or sulfonate salt functional groups based on the number of monomer units in the copolymer. In embodiments, the SC is used to form a coating on a substrate surface with the substrate made of same or different material. In other embodiments, the membrane is used as a single or multiple SC layers or films, each with a certain or preselected thickness.

In embodiments, the SC is a sulfonated block copolymer having a block copolymer molecular architecture with three or more blocks, designed to phase separate and form ion-conducting domains which enable water transmission, process that can be accelerated through application of voltage. In embodiments, the SC is selected from the group of perfluorosulfonic acid polymers such as sulfonated tetrafluoroethylene copolymer, polystyrene sulfonates, sulfonated block copolymers, polysulfones such as polyether sulfone, polyketones such as polyether ketone, and mixtures thereof.

In embodiments, the sulfonated polymer is characterized as being sufficiently or selectively sulfonated to contain from 10-100 mol % sulfonic acid or sulfonate salt functional groups based on the number of sulfonatable monomer units in the sulfonated copolymer ("degree of sulfonation"). In embodiments, the sulfonated polymer has a degree of sulfonation of >25 mol %, or >50 mol %, or <95 mol %, or 25-70 mol %.

In embodiments, the sulfonated polymer is characterized as having self-sterilizing effect, for killing at least 99% of microbes within 5 minutes of coming into contact with the coating material.

In embodiments, the sulfonated polymer is a sulfonated block copolymer, having one or more copolymer block configurations corresponding to any of A-B-A, A-B-A-B-A, (A-B-A)$_n$X, (A-B)$_n$X, A-D-B-D-A, A-B-D-B-A, (A-D-B)$_n$X, (A-D-B)$_n$X or mixtures thereof, where n is an integer from 2 to about 30, X is a coupling agent residue, and wherein each D block is preferably a polymer block resistant to sulfonation. In embodiments, the SC has a linear structure corresponding to A-B-A, (A-B)$_2$X, A-B-D-B-A, (A-B-D)$_2$X, A-D-B-D-A, and (A-D-B)$_2$X, or a radial structure corresponding to (A-B)$_n$X and (A-D-B)$_n$X, where n ranges from 3 to 6. Two or more of the A, B, C, and D-blocks may be the same or different.

In embodiments, the A-blocks are polymer segments of acrylic esters or methacrylic esters. In embodiments, the A-blocks are selected from polymerized para-substituted styrene monomers, ethylene, alpha olefins of 3 to 18 carbon atoms, 1,3-cyclodiene monomers, monomers of conjugated dienes having a vinyl content less than 35 mol percent prior to hydrogenation, acrylic esters, methacrylic esters, and mixtures thereof. If the A-blocks are polymers of 1,3-cyclodiene or conjugated dienes, the blocks are preferably hydrogenated after polymerization of the block copolymer and before sulfonation of the block copolymer. If the A-blocks are hydrogenated polymers of 1,3-cyclodiene monomers, such monomers may be selected from the group consisting of 1,3-cyclohexadiene, 1,3-cycloheptadiene and 1,3-cyclooctadiene. The A-blocks may contain up to 15 mol percent of the vinyl aromatic monomers such as those present in the B blocks.

The B blocks may contain from about 10 to about 100 mol percent sulfonic acid or sulfonate ester functional groups based on the number of monomer units, and comprises segments of one or more polymerized vinyl aromatic monomers selected from unsubstituted styrene monomer, ortho-substituted styrene monomers, meta-substituted styrene monomers, alpha-methyl styrene monomer, 1,1-diphenylethylene monomer, 1,2-diphenylethylene monomer, and mixtures thereof.

The D-block may comprise a hydrogenated polymer or copolymer of a conjugated diene selected from isoprene, 1,3-butadiene, and mixtures thereof.

X is a coupling agent residue, with the coupling agent selected from those known in the art, including polyalkenyl coupling agents, dihaloalkanes, silicon halides, siloxanes, multifunctional epoxides, silica compounds, esters of monohydric alcohols with carboxylic acids, (e.g. methylbenzoate and dimethyl adipate) and epoxidized oils.

In embodiments, the SC is hydrogenated sulfonated block copolymer having the general configuration A-B, A-B-A, (A-B).sub.n, (A-B-A)$_n$, (A-B-A)$_n$X, (A-B)$_n$X or mixtures thereof, where n is an integer from 2 to about 30, and X is coupling agent residue. Prior to hydrogenation, each A block is a mono alkenyl arene polymer block and each B block is a controlled distribution copolymer block of at least one conjugated diene and at least one mono alkenyl arene. Subsequent to hydrogenation about 0-10% of the arene double bonds have been reduced, and at least about 90% of the conjugated diene double bonds have been reduced. Each A block has a number average molecular weight between about 3,000 and about 60,000. Each B block has a number average molecular weight between about 30,000 and about 300,000. Each B block comprises terminal regions adjacent to the A blocks that are rich in conjugated diene units and one or more regions not adjacent to the A blocks that are rich in mono alkenyl arene units. The total amount of mono alkenyl arene in the hydrogenated block copolymer is about 20 percent by weight to about 80 percent by weight. The weight percent of mono alkenyl arene in each B block is between about 10 percent and about 75 percent; at least 25% of the aromatic rings of the alkenyl arene are sulfonated. The hydrogenated sulfonated block copolymer has an ionic conductivity greater than 0.08 siemens/cm.

Examples of SC that may be used are disclosed in published U.S. Pat. No. 8,222,346, and patent application nos. US20130108880A1 and US20140014289A1, incorporated herein by reference in their entirety. The SC may be prepared by anionic polymerization such as those disclosed in patent publications US20130108880A1 and US20140014289A1, incorporated herein by reference in their entirety. In various embodiments, the process may comprise polymerizing the suitable monomers in solution with a lithium initiator. The prepared block copolymers are sulfonated to obtain a sulfonated polymer product in solution and in micellar form. After sulfonation reaction, the block copolymers can be cast directly forming a membrane or film.

In embodiments, the sulfonated copolymer is a sulfonated tetrafluoroethylene copolymer having a polytetrafluoroethylene (PTFE) backbone; side chains of vinyl ethers (e.g., —O—$CF_2$—CF—O—$CF_2$—$CF_2$—) which terminate in sulfonic acid groups in a cluster region.

In embodiments, the sulfonated polymer is a polystyrene sulfonate, examples include potassium polystyrene sulfonate, sodium polystyrene sulfonate, a co-polymer of sodium polystyrene sulfonate and potassium polystyrene sulfonate (e.g., a polystyrene sulfonate copolymer), having a molecular weight of >100,000 Daltons, >400,000 Daltons, and up to 1,500,000 Daltons. The polystyrene sulfonate polymers can either be crosslinked or uncrosslinked. In embodiments, the polystyrene sulfonate polymers are uncrosslinked and water soluble.

In embodiments, the sulfonated polymer is a polysulfone, selected from the group of aromatic polysulfones, polyphenylenesulfones, aromatic polyether sulfones, dichlorodiphenoxy sulfones, sulfonated substituted polysulfone polymers, and mixtures thereof. In embodiments, the sulfonated polymer is a sulfonated polyethersulfone copolymer, which can be made with reactants including sulfonate salts such as hydroquinone 2-potassium sulfonate (HPS) with other monomers, e.g., bisphenol A and 4-fluorophenyl sulfone. The degree of sulfonation in the polymer can be controlled with the amount of HPS unit in the polymer backbone.

In embodiments, the sulfonated polymer is a polysulfone is a a polyarylether ketone, e.g, a sulfonated polyether ketone (SPEEK), obtained by sulfonating a polyetherketonketone (PEKK). The polyether ketone ketone is manufactured using diphenyl ether and a benzene dicarbonic acid derivative. The sulfonated PEEK is available as an alcohol and/or water-soluble product for subsequent used for coating membranes, for casting into membranes and films.

In embodiments, the SC has an IEC of >0.5 meq/g, or 1.5-3.5 meq/g, or >1.25 meq/g, or >2.2 meq/g, or >2.5 meq/g, or >4.0 meq/g, or <4.0 meq/g.

With the use of the sulfonated copolymer, the SC membrane is hydrophilic and hygroscopic, and also permeable to moisture but not air and gases such as nitrogen and oxygen. The membrane containing sulfonated copolymer is characterized as selectively permeable with ion exchange properties. The SC membrane is also characterized as having excellent moisture vapor transport rates (MVTR) characteristics and excellent ionic exchange capacity.

The SC membrane is also characterized as undergoing considerable swelling when it absorbs water, e.g., at least 100% at ambient temperature. In embodiments with the use of sulfonated block copolymer having a degree of sulfonation (e.g., at least 25 mol %), the SC membrane also shows anti-bacterial properties, making the AC particularly useful for sterilizing air in addition to cooling, in indoor spaces.

In embodiments, the SC membrane (film) or a coating containing SC has a thickness of >1 μm, or >5 μm, or 5-50 μm, or <100 μm, or <75 μm, or <μm. In embodiments, the membrane/coating may comprise nanocomposite materials and can have an average pore size <1 μm, or <0.5 μm, or <0.1 μm.

Sulfonated Copolymer Membrane for Use in A/C: The air conditioner unit is characterized as comprising at least a SC membrane. Moisture from air can be extracted by a water permeable membrane by creating a pressure differential between the inlet side and the downstream end or section of a membrane assembly, which drives the diffusion of the water molecules from the inlet side towards the other side of the membrane.

Depending on the unit, e.g., dehumidification unit or evaporative cooling unit, the SC membrane may be in forms other than sheets, e.g., netting, screen mesh or lattice, woven, non-woven, perforated or apertured plate, a foam, a hollow fiber membrane, or a pad having interconnecting interstices and passageways throughout the body, having the SC coated or bonded thereon. In embodiments, the SC membranes can be in spiral form or arranged in stacks, either parallel or perpendicular to the air stream direction.

The membrane may comprise SC bonded or incorporated onto a frame, another one or more membranes, a polymer matrix, or a plurality of fiber bundles by processes known in the art, e.g., casting. The SC membrane can also be applied as a coating on a fiber matrix, or on the fan blades in the evaporative cooler.

In embodiments, the SC membranes can be in the form of hollow membrane fibers, e.g., as a plurality of bundles of microporous fibers. Each fiber in a microfiber bundle may comprise a radial microporous matrix structure and a hollow capillary interior, with SC polymer preferably being coated on the surface of each fiber. In embodiments, the inner surface of each hollow fiber is coated with at least a SC polymer layer, the hollow fibers providing mechanical support to the moisture-selective one or more SC layers. In embodiments of hollow membranes, SC coatings or films may be applied on the inner, outer, or both inner and outer surfaces of the hollow fibers. Hollow fiber membranes are known in the art, e.g., as disclosed in U.S. Pat. No. 5,762,798, which is incorporated herein by reference.

The membrane can be bonded to a frame or another perforated layer serving as a support structure through which air and humidity can flow freely. A frame may comprise a metal or plastic and may be formed into any conceivable geometry, including, but not limited to, honeycomb and corrugated structures. In embodiments, the frame may have a honeycomb, spiral, non-woven or a plurality of porous designs for high surface area, with the proton conducting membrane being employed on multiple sides and with one side as opening for the air to flow in. In other embodiments, the frame is shaped as corrugated sheets with channels for increased exposed area. Depending on, for example, the amount of moisture to be removed or the size of the room, the number of membrane frames may also be varied by adding or taking out one or more frames.

The form-retaining frame can be thermally or mechanically formed and are preferably rigid, semi-rigid, or substantially rigid. As used herein, a rigid, semi-rigid or substantially rigid frame is a frame comprising a material or structure able to maintain its shape under its own weight. Suitable frame materials include fiberglass, aluminum, carbon, or a rigid polymer based on polyester, polyethylene, polypropylene, polyethylene terephthalate, polyvinylchloride, a styrene/acrylonitrile/butadiene copolymer, nylon, polytetrafluoroethylene, aramid-based polymeric fibers, metal, metal alloys, cellulose, cellulose nitrate, cellulose acetate, and combinations thereof.

A single frame may support a single membrane in each side, or the membrane assembly may comprise two or more membranes each supported by a frame connected in parallel in series to allow for a higher required voltage for mass fluxes on the order of $10^{-9}$ kg/s-cm$^2$. In one embodiment, a 5-ton air conditioning unit with a sensible heat ratio of about 0.6 would require less than 30 m$^2$ of SC membrane with IEC of at least 1.0 meq/g.

The frame preferably has a thickness sufficient to maintain strength and without interfering with air flow or moisture transport. The frame thickness may range from about 25 microns to about 500 microns, from about 100 microns to about 500 microns, or from 200 microns to 500 microns, or at least 300 microns. The thickness typically depends on multiple factors including the number of stacked layers of frames used, air flow rate, and pressure.

A frame may be porous with pore size sufficient to permit direct air contact of without interfering with moisture transport or significant pressure drop. The pore diameter can range from 0.1 to 200 microns, such as around 5 microns, up to around 8-10 mm, or larger, with the frame surface between the pores sufficient for a film or coating comprising, for example, selectively permeable and ion exchanging polymer, to be bonded onto the frame and maintain film attachment.

When SC polymer is to be applied onto membranes, matrix, fibers, etc., as a coating, the coating can be prepared using different base solvents depending on, for example, the desired coating thickness or the membrane's intended application, e.g., whether the membrane is for a dehumidifier or evaporative cooler.

In embodiment of an evaporative cooler, a SC-mediated evaporative cooling process is achieved through the evaporation of water supplied to the evaporative cooler membrane, which serves as a substrate that allows thermal energy transfer between the relatively warm, dehumidified flowing air and the cooler water molecules at or near the membrane surface over which the warm, dehumidified air flows.

The thermal energy from the relatively warm flowing air molecules near the membrane surface can be absorbed by the cooler water molecules at or near the membrane's surface, which leads to cooling of the flowing air and evaporation of the water molecules from the membrane surface. Thermal energy transfer may also occur through collisional energy transfer between the relatively cooler (lower energy) water vapor molecules that evaporated from the membrane surface and the relative warm (higher energy), flowing air molecules. Also, a vapor pressure differential on opposite membrane surfaces facilitate water evaporation from the lower vapor pressure side of the membrane.

In an embodiment of a dehumidification unit, the SC membrane is in the form of hollow fibers. Humid air flows through the hollow fibers, which are under vacuum. The hollow fibers provide a large dehumidification surface area and may be oriented parallel or perpendicular to the air flow. When the inside of the hollow fiber membrane is placed under vacuum, an osmotic gradient is generated between each of the fiber's hollow core (which are substantially under vacuum) and the fiber's outer surface. The resulting osmotic gradient generated by the pressure differential between the outer and inner surfaces of the membrane fibers allows the selectively permeable and ion exchanging polymer coated fibers to efficiently extract water from the flowing moisture-laden air.

Dehumidification Assembly: In embodiments, the dehumidifying assembly employs at least one membrane assembly, e.g., with SC membranes having a selective moisture transport capacity illustrated by an IEC greater than 0.5 meq/g for excellent moisture transport characteristics. The SC membrane can be used as part of a membrane electrode assembly (MEA), or a vacuum system, or a membrane electrode assembly under vacuum.

In a membrane electrode assembly, the SC membrane is used as a selective transport membrane sandwiched between a cathode and an anode, along with permeation layers comprising, for example, a composite structure. In embodiments, the SC membrane covers the cross-sectional area of the circulation channel in the dehumidifier. The low humidity air stream is circulated from inside an air-conditioned room, and the opposite air stream (having RH of 30-95%) is being circulated from the external, ambient environment.

In a vacuum system, the opposite or downstream side of the membrane assembly is maintained at a lower pressure compared to the inlet side by, for example, using a vacuum pump to remove the moisture from air that enters the inlet side and collected on the opposite side of the membrane where the extracted water is transported away from the dehumidifier unit, along with other gases such as nitrogen and oxygen if the membrane is permeable to those gases.

Figure 3:
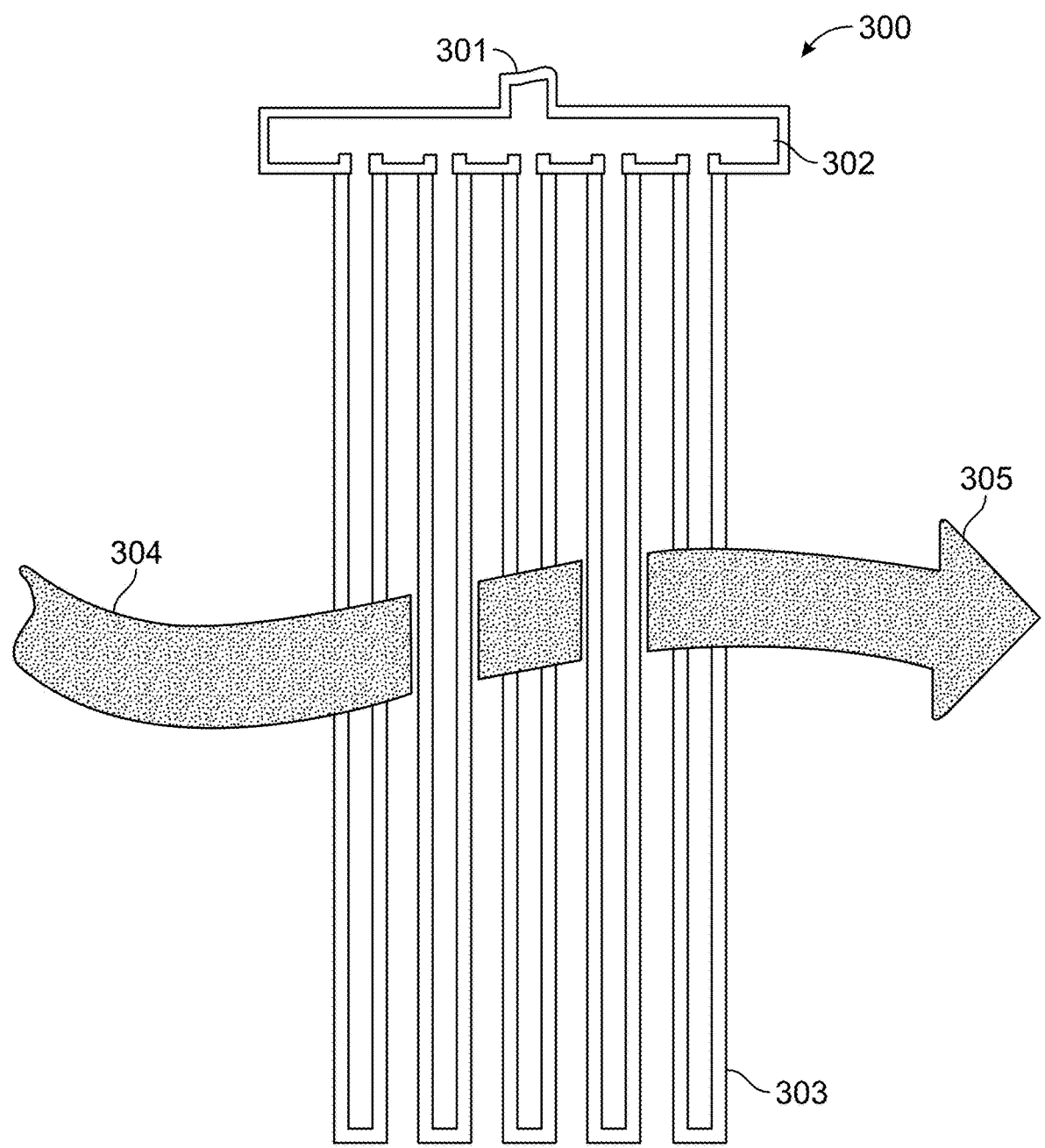
FIG. 3 is a schematic diagram illustrating an embodiment of a hollow fiber membrane (HFM) assembly.
Figure 4A:
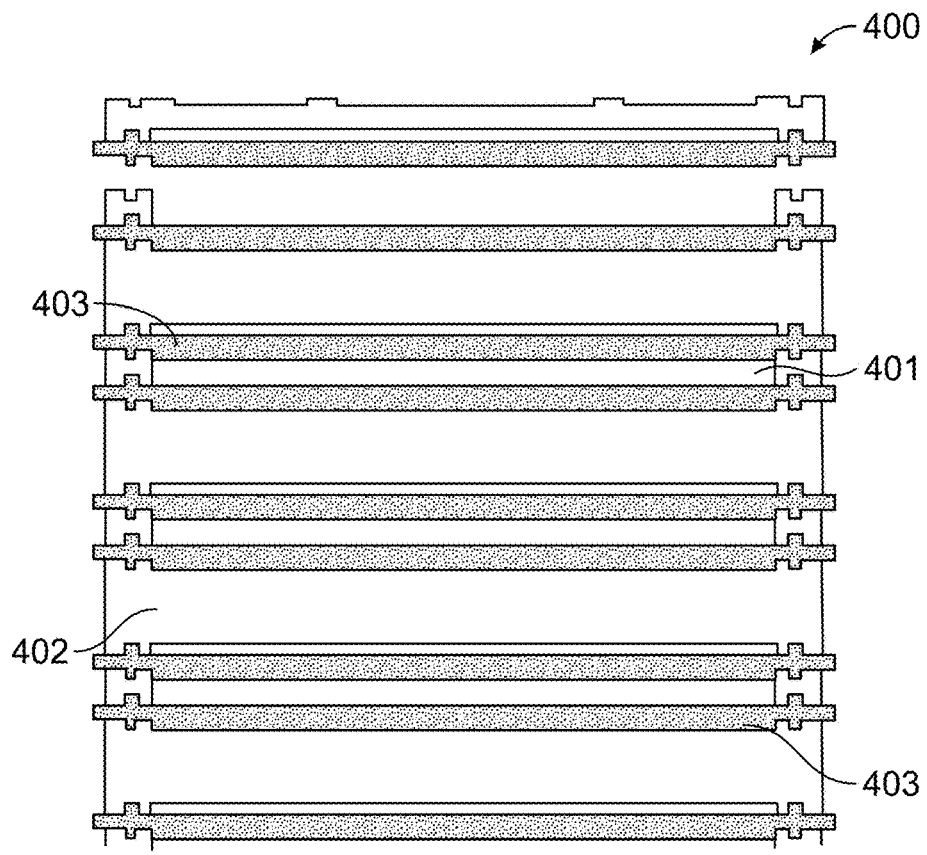
FIG. 4A is a schematic diagram illustrating an example of a stack of selectively water permeable membranes in a dehumidification system.

In one embodiment of a vacuum system, hollow SEC membranes are employed. Air dehumidification happens while air travels through the hollow fiber membranes, in which case vacuum is applied on the outside of the hollow fibers. In another embodiment of a vacuum system, the sulfonated membrane is assembled in a modular plurality of thin framed layers having alternating passages for process air and vacuum, with a perforated solid backing plate arrangement. Vacuum artificially reduces water vapor pressure, creating a favorable osmotic gradient between process air and the vacuum side. Examples of a vacuum membrane assembly are shown in FIGS. 3 and 4A. It should be noted that a vacuum membrane assembly can also be used as an MEA assembly with the provision of electrodes for enhanced air dehumidification.

In an MEA assembly, when voltage is applied across the electrodes, water molecules that enters the through the MEA air inlet undergo oxidation at the positive electrode (anode), where the water molecules dissociate (split) into protons and oxygen molecules as shown in the oxidation half-reaction (1) below. The protons, being positively-charged, diffuse towards the negative electrode (cathode), where they undergo reduction by combining with oxygen molecules to regenerate water molecules according to reaction (2) below. The net result of the voltage-driven chemical reaction occurring in the MEA 105 is the transport of water molecules from the anode (positive electrode) to the cathode (negative electrode) side of the MEA.

$$H_2O \rightarrow \tfrac{1}{2}O_2 + 2H^+ + 2e^- \qquad (1)$$

$$\tfrac{1}{2}O_2 + 2H^+ + 2e^- \rightarrow H_2O \qquad (2)$$

In the MEA Assembly, the SC membrane as a proton-conducting membrane is sandwiched between two electrodes. When a voltage is applied between the electrodes, the membrane allows the moisture from an air stream to diffuse across the electrodes. The moisture from the air stream entering the anode side flows across the composite structure to the air stream on the cathode side where it exits as a dehumidified air stream. The voltage applied across the electrodes may be varied based, for example, on the desired moisture removal capacity of the MEA. For instance, the applied voltage across the membrane may range between a few millivolts to about 10 volts, e.g., less than 5 volts or between about 2-7 volts. The greater the applied voltage, the greater the vapor transmission rate and thus the moisture removal capacity. The applied current densities may also be varied depending on environmental conditions and may range between a few micro-amps to tens of amps per inch$^2$.

The electrodes may comprise a binder and one or more electrically conductive materials, such as carbon or graphene particles, and other materials in the form of nanoparticles, nanotubes, woven or non-woven conductive fabrics among others. The electrodes may also incorporate a metal or metallic components such as Pd, LaNi$_5$ or Ti$_3$Ni, which can form a metal hydride or a metal oxide such as WO$_3$, ReO$_3$, MoO$_3$, MnO$_2$, or NiOOH·H$_2$O. The electrodes for the proton conducting membrane maybe prepared by methods known in the art including electroplating or spray coating. In some embodiments, Pt and TiO$_2$ nanoparticles may be deposited on the cathode and anode and their surface coated with a selectively permeable and ion exchanging polymer membrane. TiO$_2$ can facilitate water dissociation, enhance the membrane's hydrophilicity, and increase oxygen diffusion especially when carbon-based materials are incorporated into the MEA. TiO$_2$ is also inexpensive, widely available, and nontoxic. The modified electrode surface allows for improved water uptake and conductivity.

The conductive materials may include a catalytic material for catalyzing certain desired reactions on at least one electrode. The catalyst may be added by itself or supported on other carrier material. Examples of catalyst that may be used for the electrodes include platinum, iridium, tin and their various compounds. For example, the cathode may include a platinum (Pt) catalyst combined with carbon particles to catalyze the oxidation of protons (W) to form water. The anode may likewise include a catalyst for the reduction of water.

The MEA may also include a gas diffusion layer (GDL). A GDL is typically made of a porous material such as carbon fibers forming a conductive woven or non-woven surface. A GDL may be used to facilitate heat and mass transfer, as well as provide a mechanical scaffolding for the MEA. The GDL can also minimize catalyst corrosion or the loss (e.g., from the flow of fluid across the membrane electrodes) of any metal or metallic compound particles deposited on the electrode surfaces. Two or more gas diffusion layers may be used on the opposite surfaces or sides of the SC-based membrane, in which the cathode and anode may include metal or metallic compound particles such as Pt or TiO$_2$ particles. A thin polymer film may be deposited on the GDL to improve contact with the membrane and the GDL, extend the GDL's useful lifetime, and to minimize the loss of any added metal particles such as TiO$_2$ nanoparticles.

In embodiments with MEAs, level of humidity correlates to power requirements for promoting dehumidification, considering the energy requirement is a function of flux. The higher the humidity level in the air being dehumidified, the higher the power requirement. For example, if the air humidity levels rise significantly, the power required for dehumidification could go up substantially. Thus, when power supply is limited (e.g., the power source is solar based), lower voltage is preferably applied across the MEA to reduce the power required for dehumidification. The power requirement for moving water depends on specific selectively permeable and ion exchanging polymer characteristics, and use of materials with high ion exchange capacity (IEC) in combination to high MVTR (flux) characteristics will enable dehumidification with significant energy efficiency gains.

With the MEAs, dehumidification occurs continuously, without the need to regenerate the membrane assembly. Additionally, the use of the MEA allows dehumidification to occur when the cathode air inlet is at a higher relative humidity than the anode air inlet, working against the natural humidity gradient, allowing the system to drive dehumidification regardless of external environmental conditions. MEAs made with high MVTR and ion exchange capacities can also operate with minimal energy requirements in many environmental conditions. In an embodiment of a dehumidifying MEA, air from the room to be cooled ("RAO") transfers its moisture to the ambient air inlet ("AAI") by passing through the dehumidifier, with the moisture vapor being removed by the MEA operation. In the unit, the dehumidifier continuously preserves its dehumidifying capacity, without reaching saturation. After passing through the dehumidifying MEA, dry air ("EAI" or evaporator air inlet) is directed to the evaporative cooler located indoors. Ambient air ("AAO") and moisture is directed outside the building/room to be cooled, after the moisture transport/removal via the membrane.

The dehumidifier unit may be equipped with condensation containers or piping to allow moisture removal. In some embodiments, the dehumidifying MEA can be designed for an air conditioner (AC) unit with one dehumidifier for one evaporative cooler, or it can be designed to as AC units with one dehumidifier for multiple evaporative coolers separately located, but all in one closed loop.

In addition to AC applications, it should be noted that the MEA can also be used in other applications such as for electrolytic transfer across membranes in fuel cells. selectively permeable and ion exchanging polymer with an IEC value of at least at least 0.5 meq/g may also be used for general cooling applications, e.g., for cooling towers, including those used in nuclear power plants. For example, selectively permeable and ion exchanging polymer may be used in a cooling unit comprising heat pipes as heat transfer elements and porous ceramic tubes coated with one or more selectively permeable and ion exchanging polymer layers to achieve cooling via liquid (e.g., water) vaporization.

Evaporative Cooling Unit: In evaporative cooling, water is evaporated by and into the dry air stream to provide cooler air. Heat is removed from the surrounding air in order to accommodate evaporation, thus cooler air is produced. Evaporative cooling of the dry air stream from the dehumidifier is achieved in an indoor unit. In the evaporative cooler, dry air is passed over one or more fans. As water is dripped over an evaporative cooling pad or media, it is absorbed by the membrane. The evaporation of water by the dry air stream passing over these substrates resulting in removal of latent heat, for cooled air (evaporator air outlet "EAO") exiting to cool the room.

Evaporative cooling provides several advantages over conventional air-conditioners that require, for example, hydrocarbon-based refrigerants for the vapor compression cycles. Evaporative coolers do not require commonly-used refrigerants and they have relatively few mechanical parts and are thus less expensive and simpler to build than conventional air conditioning systems. Importantly, evaporative coolers have a much smaller carbon footprint than conventional refrigerant-based air conditioning systems. This advantage makes evaporative coolers a very appealing alternative to conventional air conditioning systems in view of increasing demands for environmentally-friendly technologies as a result of rising concerns about the effects of global warming. Evaporative coolers are also more affordable than conventional air conditioners and thus provide a practical alternative to a great number of people around the world that cannot afford the cost of conventional air conditioners but who are now experiencing rising temperatures over longer periods. As a result, cooling systems are increasingly becoming a necessity, rather than a mere luxury, in many parts of the world.

Membrane-based cooling systems share some features similar to those of membrane-based dehumidifier. In the case of evaporative coolers, water, aqueous solutions, or other liquids are used to achieve the cooling process via liquid evaporation of the liquid molecules transported to and absorbed by the membranes. A pressure differential or gradient between two opposite sides or surfaces of the membranes drives the diffusion of the liquid such as water from the inlet side having a higher vapor pressure towards the opposite membrane surface exposed to a lower vapor pressure. Upon reaching the opposite surface of the membrane, the liquid molecules undergo evaporation. The rate of evaporation of the liquid molecules depend on how low the vapor pressure is on the opposite side of the membrane.

The heat/energy required for water evaporation from the surface of a water-soaked membrane may be provided by a relatively warm air passing over the membrane surface. The absorption of heat (referred to as sensible heat) from the air drives the evaporation of the liquid, which in turn cools the flowing dry air. The water molecules that evaporated from the membrane surface can become entrained with the flowing air, which increases the flowing airs humidity to varying extents, depending on the water's rate of evaporation, which in turn depends on the temperature and vapor pressure above the membrane surface where evaporation occurs. Depending on environmental parameters such as pressure, pressure gradient, and ambient temperature, evaporative coolers may be used not only for cooling air but also for food and beverage storage and refrigeration.

In embodiments, the evaporative cooling unit comprises a fan assembly and an evaporative cooling pad or media. It is noted that the fan assembly can be part of the evaporative cooling unit, or it is a separate component but still part of the AC unit, for circulating air within the AC unit.

In embodiments, the evaporative cooling pad (cooler media) comprises conventional membrane/pad as used in the prior art, e.g., made of porous fibers, paper, etc. However, SC membranes, or selectively permeable and ion exchanging polymer based membranes of provide a significant advantage over conventional membrane-based evaporative coolers because membranes used in conjunction with the SCs, e.g., by coating the membranes with selectively permeable and ion exchanging polymer can achieve greater cooling, as well as require less water and thus less need for frequent water reservoir refilling, especially when using portable-sized evaporative coolers.

In one embodiment, the evaporative cooler comprises a high velocity mist evaporation system as disclosed in US Patent Publication No. 20140027528A1, incorporated herein by reference in its entirety, wherein at least at least one of the fan includes a van axial fan, and with a plurality of nozzles provided on the blades of at least a fan. The nozzles are of the mist emitting nozzle type, spun to induce centrifugal fluid pressure in the nozzles to create a fine mist, resulting in rapid evaporation via the high velocity mist exit speed into a refresh air stream. In embodiments, the nozzle (s) can be located at or adjacent to a blade fan tip. In this way, the relatively high tip speed of the fan with respect to the rest of the rotating fan ensures the velocity of the nozzle(s) is therefore high; whereas, the actual refresh airflow velocity induced by the fan blades is relatively low to save energy.

In embodiments, a portion of the evaporative cooler media may comprise of SC coating over hollow fiber membranes, in which case the hollow side of the fibers are supplied with water which wets the polymer coating and provides cooling through evaporation of water from the membrane surface.

In other embodiments, the fan assembly comprises at least an evaporative cooler media (cooling pad) stretched across the fan blades. In yet other embodiments, In embodiments, the fan assembly comprises a plurality of fan blades coated with SC (e.g., by dipping, spray coating), or covered with an SC-based membrane film to allow evaporative cooling via water evaporation from the SC-coated fan blades. Passing air is driven by the fan shape while the centrifugal forces exerted by the fan rotation drive water into the SC membrane. Cooling effect is enhanced considering enthalpy of free water evaporation is sensibly lower than that of absorbed water in the selectively permeable material, promoting lower water consumption for similar cooling effect. Fans with membrane-coated fan blades allow faster water evaporation rates and also increase the air stream flow rates and thus enhance the one or more cooling units' efficiency. This would be particularly advantageous in cases where large air volumes need to be cooled, e.g., when cooling large enclosed areas.

The evaporative cooling system may comprise the primary evaporative cooling system by itself, or it may be included as an additional evaporative cooling system apart from the one or more other evaporative cooling media configurations described herein.

Additional Components: In embodiments (not shown), the AC system further comprises an energy recovery unit, in order to provide a fresh air stream, as the first component from the room air intake. The order of the components displayed can vary depending on psychometric system requirements, meaning that air can be cooled and then dehumidified, or alternatively it can be dehumidified and then cooled.

In embodiments (not shown), the air can be cooled in stages with intermediate steps for dehumidification, for maximizing cooling efficiency without saturating the process air with moisture. In these cases, the AC further comprises at least one air propulsion fan which can be positioned at any location within the system. The air propulsion fan can be any of axial, tangential or other designs.

A/C Operations: The air conditioner unit is characterized as comprising at least a SC membrane covering the cross-sectional area of the circulation channel in the dehumidifier, and an optional SC membrane stretching across the fan blades in the evaporative cooler. Moisture from air can be extracted by a water permeable membrane by creating a pressure differential between the inlet side and the downstream end or section of the membrane assembly, which drives the diffusion of the water molecules from the inlet side towards the other side of the membrane. The opposite or downstream side of the membrane assembly can be maintained at a lower pressure compared to the inlet side by, for example, using a vacuum pump to remove the moisture from air that enters the inlet side and collected on the opposite side of the membrane where the extracted water is transported away from the dehumidifier unit, along with other gases such as nitrogen and oxygen if the membrane is permeable to those gases.

The SC-mediated evaporative cooling process is achieved through the evaporation of water supplied to the evaporative cooler membrane, which serves as a substrate that allows thermal energy transfer between the relatively warm, dehumidified flowing air and the cooler water molecules at or near the membrane surface over which the warm, dehumidified air flows.

The thermal energy from the relatively warm flowing air molecules near the membrane surface can be absorbed by the cooler water molecules at or near the membrane's surface, which leads to cooling of the flowing air and evaporation of the water molecules from the membrane surface. Thermal energy transfer may also occur through collisional energy transfer between the relatively cooler (lower energy) water vapor molecules that evaporated from the membrane surface and the relative warm (higher energy), flowing air molecules. Also, a vapor pressure differential on opposite membrane surfaces facilitate water evaporation from the lower vapor pressure side of the membrane.

In embodiments, the air conditioning unit uses membranes such as hollow fiber membranes (HFM) in both the dehumidifying unit (DEH) and the evaporative cooler (EVAP), and wherein the membranes of the DEH and EVAP units are positioned right next to each other. The separate membranes of the DEH and EVAP units may be placed sideways next to each other or positioned one on top of the other. The DEH and EVAP membranes may be physically separated by applying an epoxy potting on the adjacent sides or surfaces of the two separate membranes. In embodiments, a region or space in the air conditioning system directly above or the side of a surface of the two adjacent membranes is provided to allows the air stream to flow from one membrane to the other adjacent membrane. This arrangement allows for a more compact air conditioning system. Here, the air stream that needs cooling, humidification, or both, may first enter the air conditioning system through the air inlet of either the DEH or EVAP. For example, the air stream from an enclosed space or an outdoor ambient air stream may first enter the dehumidifier unit and then towards the cooling stage.

The air conditioning system as disclosed allows independent control of the humidity and temperature, providing flexibility in terms of the range of desired temperature and humidity levels. These variables can be selected depending on the prevailing external conditions, the personal preferences of the occupants of a structure being dehumidified or cooled, or the type of facility in which the air humidity and temperature needs to be regulated. For example, the cooling unit may be turned off if the air in the room is already at the desired temperature but needs to undergo further dehumidification.

In embodiments, excess water vapor and other gases such as nitrogen can be purged from the system as exhaust air, e.g., by using a fan, an air compressor or a vacuum pump to discharge the gas through a return outlet, maintaining the required pressure differential and allow evaporative cooling to occur as required, by any selected temperature and/or humidity settings, or for as long as the dehumidifier and cooling units are running. The dehumidified, cooled air then enters the room in which the air temperature and humidity levels are being regulated. When the air in the room becomes relatively humid and/or warm, the humid and warm air is circulated back to the dehumidifier/evaporative cooler and the cycle begins again until the desired temperature and/or humidity levels are reached.

Depending on prevailing environmental conditions or the intended application of the SC membraned based air conditioning systems, only one of the integrated dehumidifier and cooling units may need to be enabled or powered on. For example, a warm and humid room air stream will typically require both cooling and dehumidification. In this case, the air conditioning system's cooling and dehumidifier units will need to be enabled. If the room air is cool and humid, only the dehumidifier will typically be running.

It should be noted that the dehumidifier and cooling units are assembled in series, with the evaporative cooling unit position either before or after the dehumidifier unit. Further, in some embodiments, the air conditioning system comprises a plurality of evaporative cooling and dehumidifier units, for capability adjustment based on environmental demand or for service during maintenance, for equipment to be swapped in/out for maintenance. In yet other embodiments, the system comprises a plurality of evaporative cooling components and dehumidifier components, which can operate independently from each other, each with air intake and exhaust into the conditioned area, with independent or coordinated controls. The process of evaporative cooling and dehumidification can be done within the same unit, or separated into different, independent devices with separate or integrated control units. When evaporative cooling and dehumidification happen in the same unit, cooling can precede dehumidification using reversible fans, enabling dehumidification preceding cooling steps.

Compared to conventional membranes used for evaporative cooling, the SC-based membranes allow more efficient cooling and can achieve lower cooling temperatures or requiring a smaller amount of water compared to conventional evaporative cooling media, due to the higher enthalpy of evaporation of absorbed water in such membranes compared to free water which is typical of traditional evaporative cooling media. This advantage may thus allow for greater flexibility in the design of evaporative cooling systems and the range of their applications that vary from cooling enclosed spaces to food storage and refrigeration. Another advantage afforded by the SC-based cooling systems is their relatively low cost compared to conventional, commercial air conditioners and refrigeration systems. Importantly, the SC-based cooling systems do not require hydrocarbon-based refrigerants, especially those that have been implicated or that contribute to global warming to varying extents. Thus, the air conditioning systems have low environmental impact, a beneficial and desirable feature of any next-generation air conditioning systems.

The air conditioner disclosed herein is characterized as being energy efficient, and not requiring a chemical refrigerant. The unit can be designed/sized for cooling buildings, homes, or confined places such as mobile homes, freight carriers, etc., with a low environmental footprint as compared to air conditioners in the prior art. The unit can also be adapted to be sun-powered for the operation of the dehumidifier and the evaporative cooler for dramatically lower energy requirements. The unit can also work for general cooling applications, e.g., cooling towers, including cooling towers in nuclear power plants.

Reference will be made to the figures, showing embodiments of the AC systems.

FIG. 1 is a schematic diagram of an embodiment of SC-membrane based AC system 100, comprising an evaporative cooling unit 106 and a dehumidification unit 102 for cooling and/or dehumidifying a room 103 inside an enclosed structure. The AC system 100 may be installed adjacent to or through a wall (e.g., as a window-type or split-type system) of the room/space 103 to be cooled.

The SC-based air conditioning system 100 may be based on one of several possible configurations, e.g., as a window-type unit or as an external unit installed in the vicinity of the structure to be cooled and/or dehumidified. The selection of an air conditioning configuration depends on various criteria such as the size of the structure to be dehumidified and/or cooled, typical environmental conditions in the area where the air conditioning system is to be installed, cost, etc.

SC-based membrane 104 forms part of a membrane electrode assembly (MEA) 105 of the dehumidification unit 102. SC-based membrane 104 provides a relatively low cost and efficient air dehumidification and cooling because of the SC-based membranes' favorable combination of good proton conductivity, mechanical or tensile properties, swelling properties, hydrophilicity, and stability in hydrated state.

The AC system 100 has at least one fan 112 for directing the humid room air 107 towards the MEA of the dehumidifier unit 102, which may be located outside the room. The dehumidifier 102 extracts moisture from the cooled, humid room 107 air through the MEA 105, which allows the passage of water vapor from air but blocks the passage of other air components such as nitrogen, oxygen, and argon, as well as small particles in the air. The diffusion of the water molecules across the SC-based membrane 104 in the MEA 105 is facilitated by the application of a voltage across the positive electrode (anode) 108 and negative electrode (cathode) 109, at the two opposite surfaces or sides of the SC-based membrane 104.

The SC-based dehumidifying unit 102 can be used for dehumidifying air with a relative humidity (RH) value ranging from 10-95%. In embodiments, the dehumidified air is routed to the evaporative cooling pad 106 if the dehumidified air needs to be cooled. After extracting the water vapor from the humid air, the MEA-based dehumidifier unit 102 may discharge the extracted room air moisture to an external air stream, e.g., via an air return 110. Alternatively, the collected air moisture may be routed to a water reservoir 111 that supplies water to evaporative cooling pad 106 where the extracted moisture may be used for evaporative cooling.

In addition to at least one fan 112 to draw air through the cooling pad, and a water reservoir 111, the evaporative cooler 106 may also include one or more of: water level control valves for water delivery, a pump for pumping water to the membrane assembly, a water distribution unit such as atomizer, sprinkler, or spray nozzles for distributing water across the membrane assembly, drain container positioned at or near the bottom of the cooler housing for collecting water, and an discharge pipe or outlet for water removal.

In embodiments (not shown) of evaporative cooling unit 106, the water supplied to the membrane by the water reservoir 111 is preferably configured to enter through the side of the membrane in a way that maximizes water absorption by the membrane, and also maximizes water evaporation from the membrane surface from which water evaporation occurs. Water from the water reservoir 111 may flow into a side or surface of the membrane that is oriented parallel or perpendicular to the membrane surface from which water evaporation takes place. But in general, the water supplied to the membrane may flow into the membrane from any side, surface, section, or portion of the membrane that maximizes water absorption by the membrane and also maximizes water evaporation from another membrane side or surface. Water absorption by the membrane and water evaporation from a membrane surface can also be optimized by adjusting the flow rate of the water supplied to the membrane.

Although not shown in FIG. 1, the dehumidifier and cooler units are typically housed in a protective housing made from corrosion-resistant materials such as polyvinyl chloride PVC, engineering plastics, or fiberglass.

Figure 2:
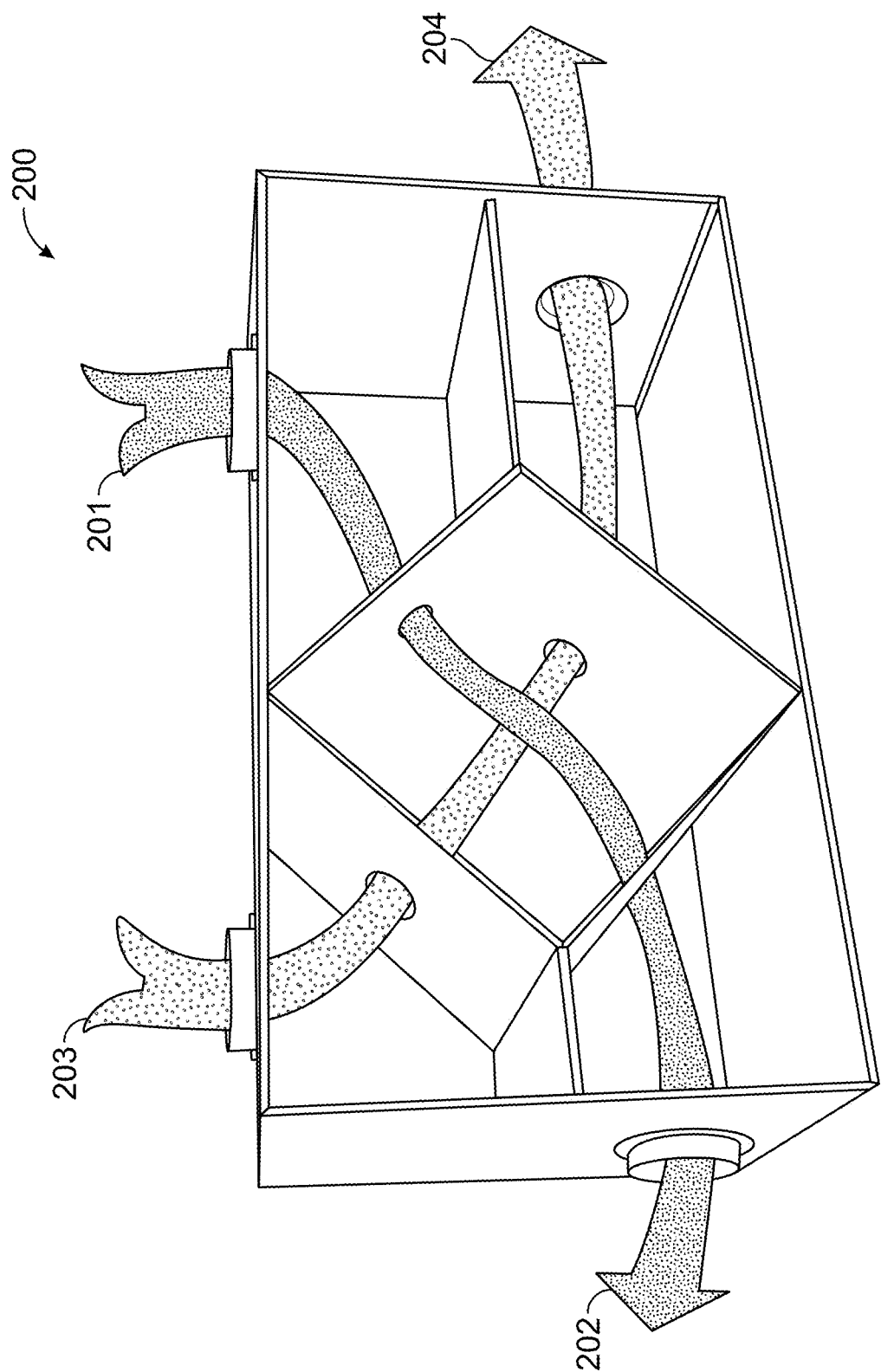
FIG. 2 is a schematic diagram illustrating an embodiment of a dehumidification component within an air conditioning unit.

FIG. 2 is a schematic diagram illustrating an embodiment of a dehumidification component within an air conditioning unit, with a selectively permeable and ion exchanging capable membrane assembly, scavenging moisture from room process air and rejecting it into an exterior air stream, enabling room return air to be of controlled moisture content. The selectively permeable and ion exchange SC polymer can be used to drive moisture transfer to enable room dehumidification via the MEA mechanism as illustrated in FIG. 1, in which case the selectively permeable and ion exchanging polymer membranes are energized through electrodes to drive moisture unidirectionally. In embodiments (not shown), the moisture transfer can also be driven via a second mechanism, with SC polymer membranes being employed in an assembly of polymer membranes, e.g., as in an array of mechanical supporting structures, with vacuum application on the moisture rejection stream. These two mechanisms are not mutually exclusive, and can be used in combination to obtain optimum energy efficiency of the AC system.

As shown in FIG. 2, dehumidifying assembly or stack 200 with a plurality of selectively permeable and ion exchanging polymer membranes, e.g., SC membrane layers, forms an enclosure for two independent air streams: 1) humid room air intake 201 is returned to room as dehumidified air 202; and 2) outside air intake 203 is exhausted to outside as humidified air 204. The SC membrane can also be employed in the form of a composite or one or more sheets having SC film covering the surface area of the air stream channel, allowing pass-through moisture to be moved to the adjacent air stream.

FIG. 3 is a schematic of a hollow fiber membrane (HFM) assembly 300 with fibers coated with a SC polymer, enabling water movement from passing air into the vacuum chamber for dehumidification, with dehumidifier air intake 304 and dehumidified air return 305. The hollow fiber membrane assembly provides mechanical support and a high surface area with a plurality of hollow bundles of fiber 303, coated with SC polymer, enabling a compact design with high moisture removal rates. HFM can be installed in an assembly to be sized based on psychometric requirements of the system. Vacuum chamber is provided with a vacuum extraction port 301, and sealed with potting base 302.

FIG. 4A is a schematic diagram illustrating yet another embodiment of a dehumidification assembly 400, comprising of a stack of SC membranes arranged in a frame-and-plate assembly with alternating process air channels 401 and vacuum chambers 402. SC membranes 403 are provided with modular, framed layer support structures for mechanical support against forces created by the vacuum chambers. The vacuum chamber 402 in-between the air channels 401 establish an osmotic gradient between alternating air channels 401 and the vacuum regions 402.

Figure 4B:
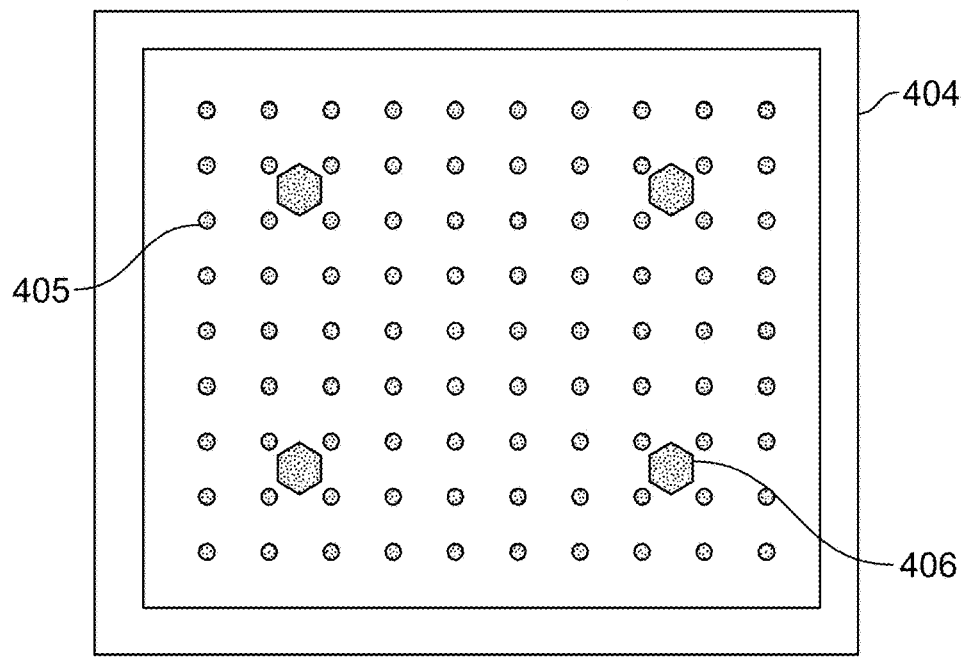
FIG. 4B is a schematic diagram of the central plate in each layer of moisture extraction from FIG. 4A.

In FIG. 4B, the vacuum chamber and the membranes 403 are supported by a plate 404 with evenly-spaced perforations 405 for the passage of moisture. The backing plate can be installed on the membrane assembly 400 using fastening or supporting protrusions 406.

Figure 4C:
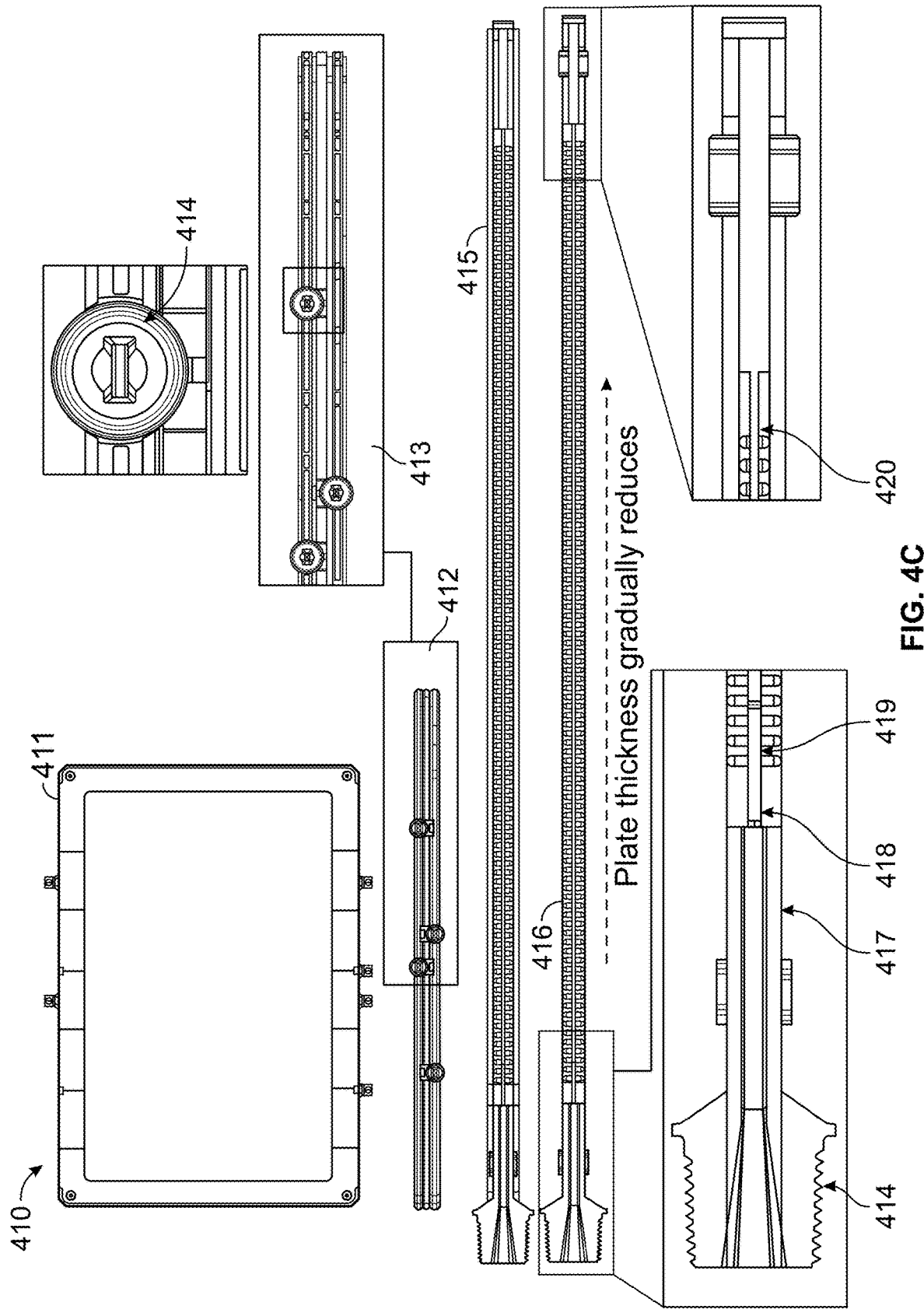
FIG. 4C illustrates details of a moisture extraction plate assembly with vacuum driven diffusion, with design features engineered for maximizing active membrane surface area.

FIG. 4C illustrates components of a moisture extraction plate assembly with vacuum driven diffusion, with design features engineered for maximizing active membrane surface area. In FIG. 4C, top view of a dehumidification plate assembly 410 is shown, along with its side view showing two layers of plate assemblies 412. The moisture extraction plate has a plurality of spacing fins 411 to enable passage of process air. The moisture extraction assembly is provided with a plurality of moisture extraction ports 413, each having threaded vacuum connection 414. The moisture extraction assembly is provided with a supporting frame 415 (as shown via side view). As shown with supporting frame 416, the thickness gradually decreases to enable dimensional optimization to support the SC membrane 417.

Figure 4D:
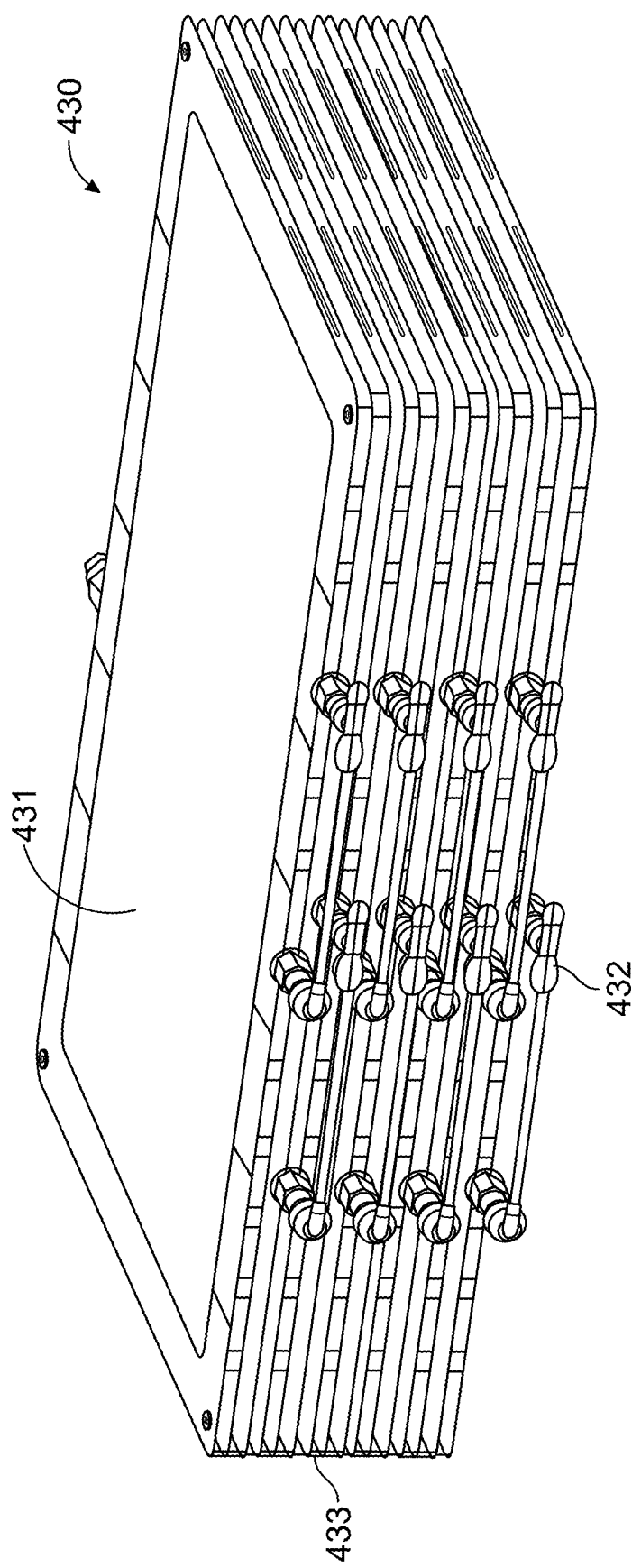
FIG. 4D illustrates an overview of the dehumidification core with vacuum connections for moisture extraction.

FIG. 4D is an illustration another embodiment of a membrane stack or array 430, having a plurality of plates showcasing the SC membrane layers 431, which uses supporting structures 415 of the plate assembly 410 (in FIG. 4C). The plate frame 411 secures each vacuum layer components in place and provides spacing between plate layers through fins, creating space for process air passage 433. Each plate frame 416 is equipped with single or a plurality of moisture extraction ports 414 which are sequentially connected via vacuum extraction connection 432 to a vacuum source for activating the dehumidification of passing process air. A similar stack or array can be used to accommodate membrane electrode assemblies, e.g., membrane 431 (MEA if connected to a power supply).

Figure 5:
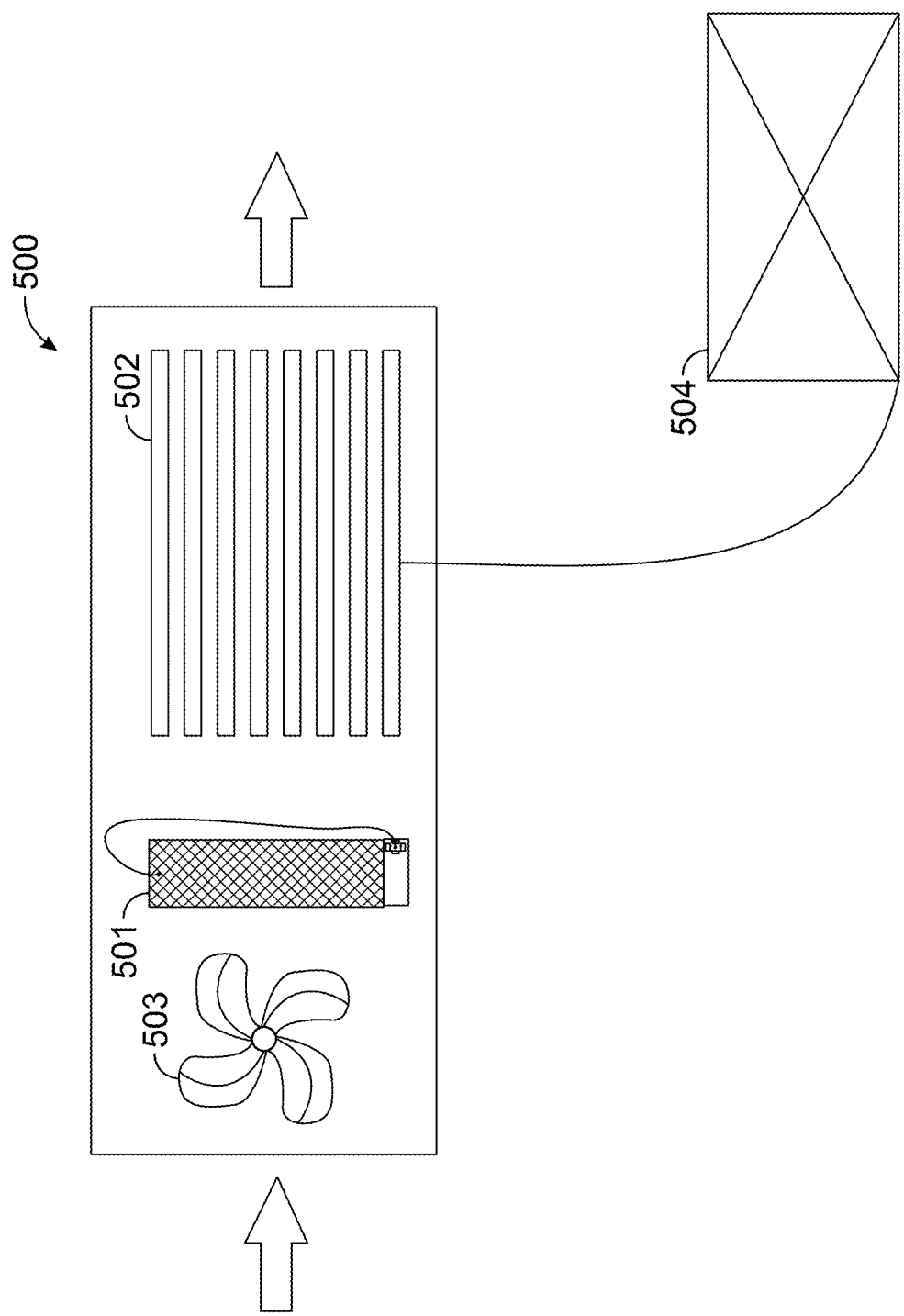
FIG. 5 is a schematic diagram showing an overall air conditioning system.

FIG. 5 is a schematic diagram showing an overall air conditioning system 500 comprising of a cooling unit 501, dehumidifying unit 502 and a fan 503, in association with a vacuum source or power supply when the system is used in membrane electrode assembly context. As shown, the evaporative cooling unit 501 and dehumidifying unit 502 are arranged in series, which may be installed as a window-type air conditioning system. At least one fan 503 draws room air towards the membrane-based evaporative cooling unit 501 and dehumidifier unit 502. At least one of the membrane assembly in either the evaporative cooler 501 or dehumidifier 502 comprises one or more SC membrane, configurations, or layers. A vacuum pump or power supply 504 is connected to the air conditioning unit 500 to drive dehumidification of the process air, as well as to collect excess moisture and condensed water extracted from the air conditioning unit 500. At least part of the collected water may be routed to the membrane-based evaporative cooling unit 501.

Either the cooling unit 501 or dehumidifier unit 502, or both, may be adjusted to a lower power setting or turned off manually or automatically when the circulating room air remains within the desired range of temperature and humidity levels over a certain period. Alternatively (not shown), the evaporative cooling and humidifier units may be installed separately and be operated independently in different room locations. Here, room air may first enter the dehumidifier unit to undergo dehumidification, and the dehumidified air is then routed to the evaporator cooling unit installed in another part of the room where the dehumidified air undergoes cooling. After going through evaporative cooling, the now cooled and dehumidified room air flows into the room where the conditioned air circulates for some time. The circulated room air then goes through another cycle of cooling and dehumidification steps, with the whole air conditioning system operating in a closed loop. Depending on the prevailing environmental conditions, the evaporative cooler, dehumidifier, or both may be manually or automatically set to a lower power setting or powered down depending on environmental conditions.

Figure 6:
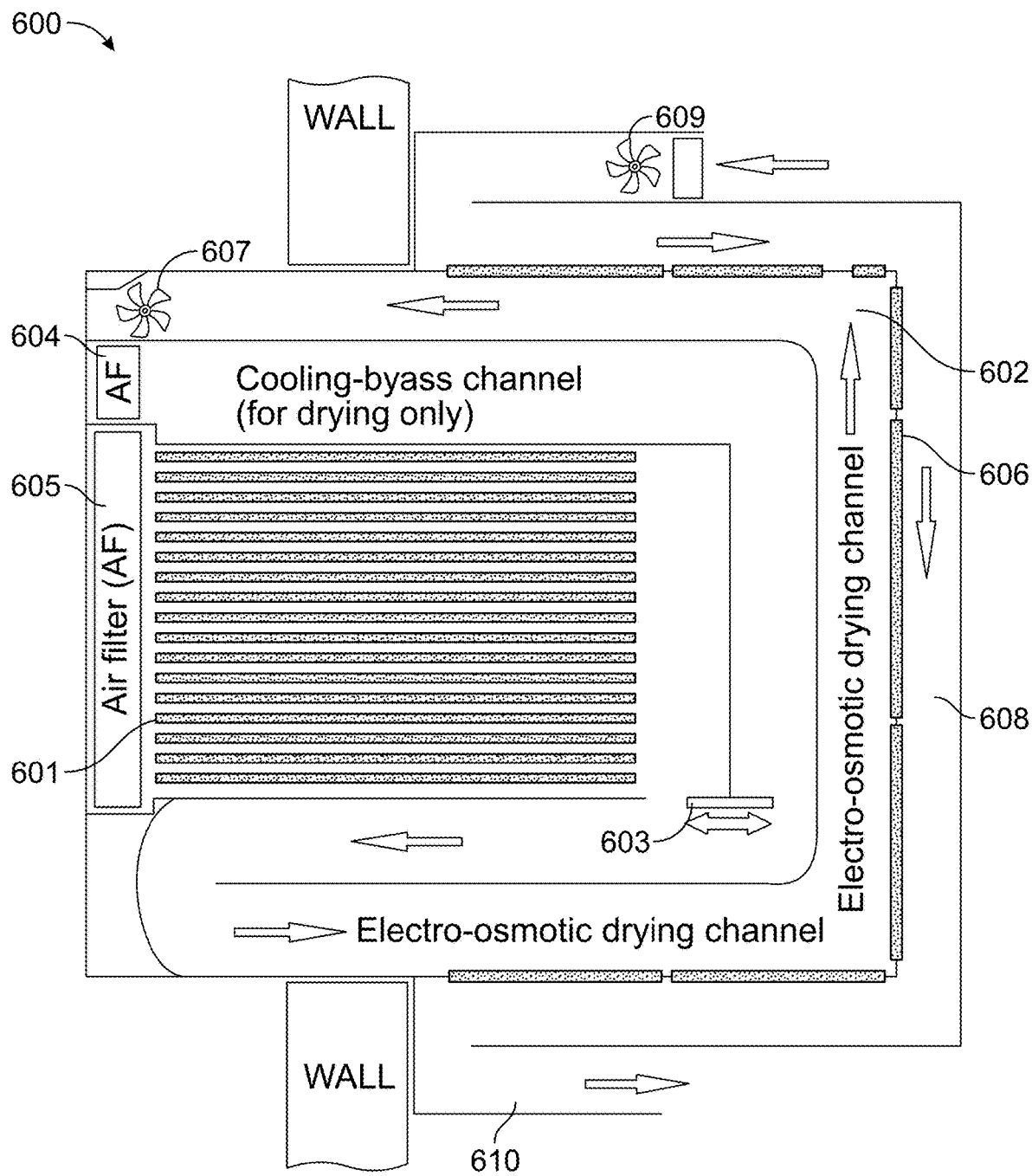
FIG. 6 is a schematic diagram of an embodiment for a window air conditioner.

FIG. 6 is a schematic view of an embodiment of an AC unit 600, e.g., an air conditioner with an evaporative cooler in combination with or independently from a membrane electrode assembly based dehumidification system. The dehumidification unit 601 comprises a dehumidification tunnel 602, and air is channeled to this tunnel directly from room air intake or alternatively from the evaporative cooling unit. As shown, an air flow selection damper 603 enables the air conditioner to be used as a dehumidifier, a cooler or an air conditioner, by channeling air through the cooler 601 before reaching the dehumidification tunnel 602 or directly from the air intake 604 to the dehumidification tunnel 602.

Figure 7A:
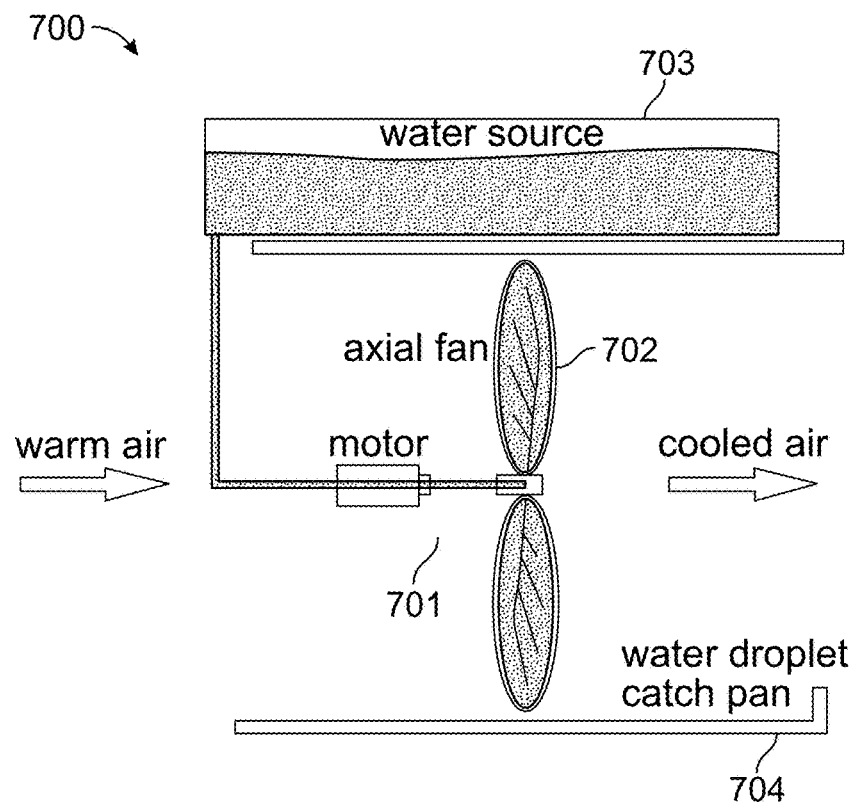
FIG. 7A is a schematic diagram of an embodiment of a fan for use in an air conditioner.

FIG. 7A is a schematic view of an embodiment of an evaporative cooling unit 700 with a fan assembly 701. The fan assembly is designed not only to direct air flow but also functions as an evaporative cooling medium for water evaporation. The fan assembly provides evaporative cooling through one or more membrane layers, incorporated SC membranes or coated with SC polymer, or laminated with SC membrane on the fan blades 702. A water source 703 supplies water to the membranes coating the fan blades 702. The fan blades 702 preferably comprise water channels (e.g., the fan blades comprise hollow inner cores or sections) to allow water from the water reservoir to flow into the fan blades 702 through water conduits leading to the fan blades, functioning as a water distribution system. Water condensate or droplets from the fan assembly 701 are collected by a water basin 704 below or adjacent to the fan assembly 701.

Fan blades 702 preferably comprises of a porous material or a solid material with water distribution channels to allow the supplied water flowing through the hollow inner portion of the fan blades to permeate to the membranes on the fan blades 702.

Figure 7B:
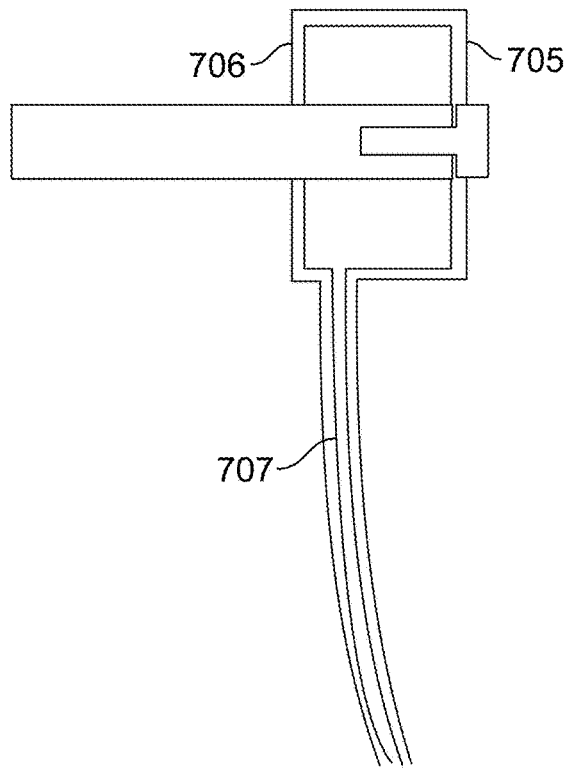
FIG. 7B is a schematic diagram of an embodiment of a hollow blade in a fan.

FIG. 7B is a schematic diagram showing details of an embodiment of the hollow blades 705 that may be used in the evaporative cooling unit 700 shown in FIG. 7A. The water used for evaporative cooling may be supplied by a nearby water reservoir 703 or supplied by a water reservoir in the fan hub 706. The membrane may be directly deposited on the fan blades 705 in the form of a coating or laminate, which may eliminate the need for a separate membrane unit that serves as an evaporative media adjacent to the fan. Water in liquid form, water vapor, or water mist may be provided to the fan blades' surface from a water source near the fan assembly or through a water reservoir located within the fan assembly, e.g., inside the fan hub 706. The water supplied from the fan hub 706 may be supplied to the membrane coating the fan blades 705 through the hollow fan blades' hollow core 707, where water then permeates through small perforations on the hollow fan blades 705. Alternatively, water from the fan hub 706 may be pumped into the hollow core 707 of the fan blades 705 made of a water-permeable material from which water permeates towards the fan blade surface and then gets absorbed by the membrane coated on the fan blades 705.

Figure 8:
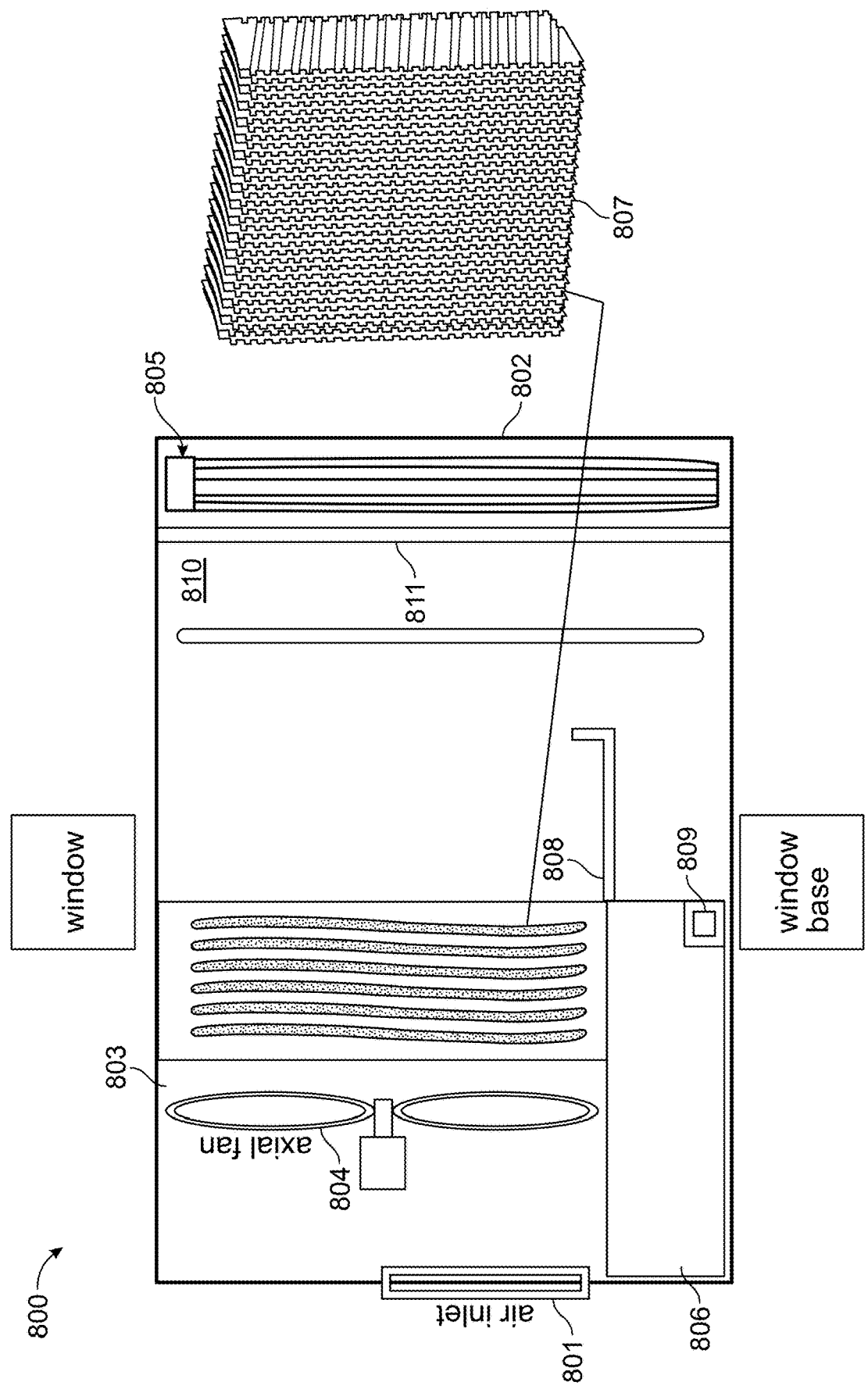
FIG. 8 is a schematic diagram showing the side view of an embodiment of a window air conditioning system.

FIG. 8 is a schematic diagram illustrating an example of a window-type evaporative cooling unit 800, comprising a motive fan, evaporative cooling unit and a membrane electrode assembly dehumidification tunnel. The cooling chamber includes an air inlet 801 and an air outlet 802 at the other end of the cooling assembly 803. An axial fan 804 is used to draw an air stream (e.g., from any of a dehumidifier unit, a room, or outside ambient air) that enters the evaporative cooling unit 800 through the air inlet 801. The axial fan 804 may comprise metallic or non-metallic fan blades. The fan blades may be at least 2"-5" in diameter (or width), but other dimensions may be used. In some embodiments, the fans may be perforated, made of porous materials, or be coated with selectively permeable and ion exchanging SC polymer membranes. A tangential fan 805 may be installed near or at the cooling unit's air outlet 802. A water reservoir 806 supplies water to the evaporative pad or medium 807. A water basin 808 collects any excess water or water condensate. A pump 809 supplies water to the evaporative cooling pad 807.

The axial fan 804 may comprise blades coated or laminated with proton conducting membranes, e.g., SC membrane. A dehumidification tunnel 810 is comprised of a space for passing air being dehumidified with the exterior wall 811 comprised of a dehumidifying MEA which scavenges moisture from the process air, rejecting it into an air stream driven by a fan 805 to discard the excess moisture outside 802.

Figure 9:
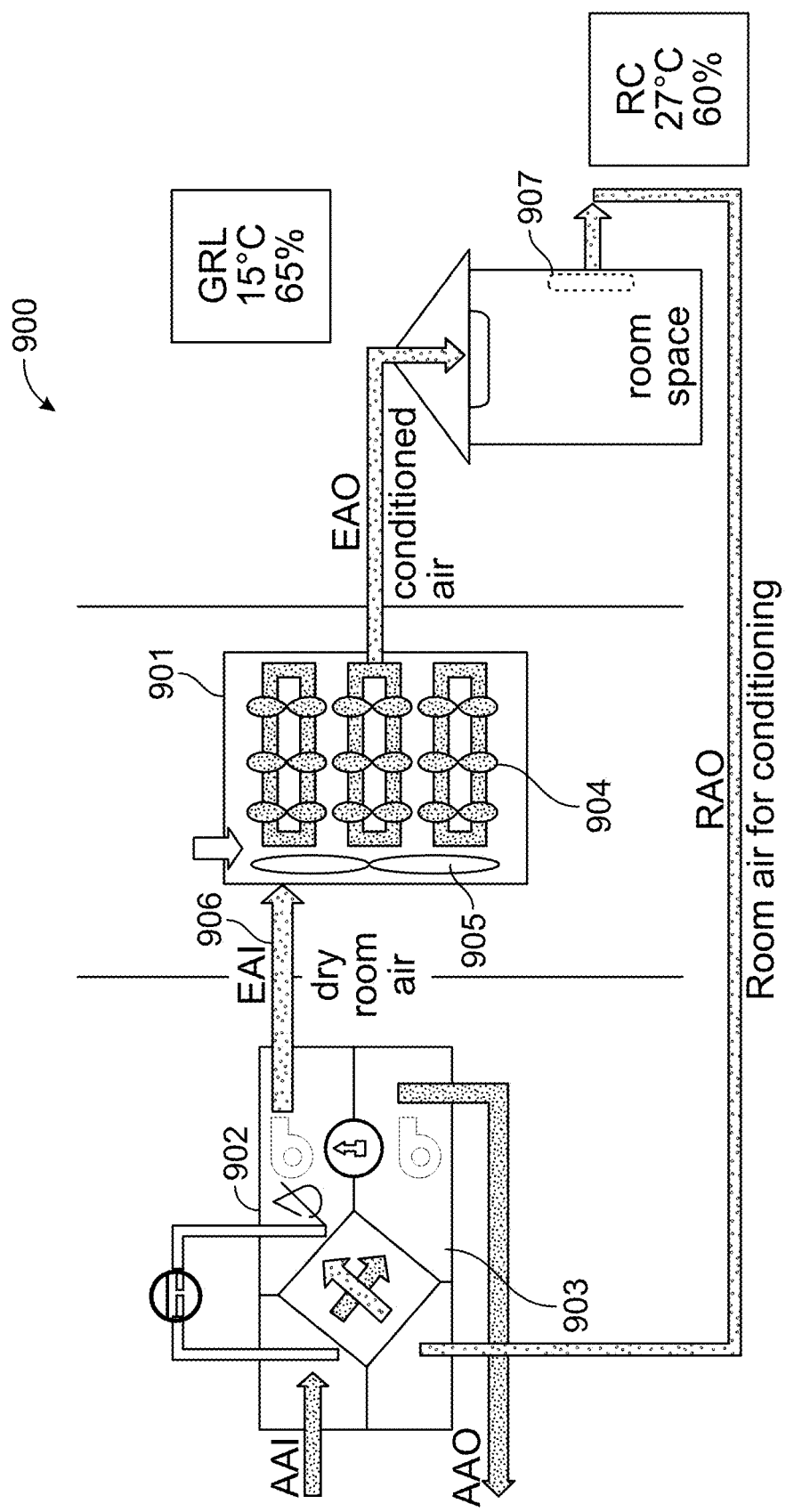
FIG. 9 is a schematic diagram illustrating the various components in an embodiment of an air conditioning system.

FIG. 9 is a schematic diagram illustrating an embodiment of an air conditioning system 900. The system employs an evaporative cooler 901 and a selectively permeable membrane assembly dehumidifier 902, which can be based on a membrane electrode assembly (MEA) 903 (or a vacuum driven core assembly). The evaporative cooling unit 901 may include a SC membrane component in the evaporative cooling pad 904, or in the fan 905 at the air intake that drives air from the dehumidifier 902. The ambient air intake (AAI) is drawn into the dehumidification core to collect rejected moisture from the room air, before cooling in the evaporative cooling system. Conditioned air is then returned to the room 907. In the figure, AAO refers to Ambient Air directed outside. EAI refers to evaporator air inlet. EAO refers to evaporator air outlet. RAO refers to room air outlet. RC refers to room condition.

The ambient air (AAI) at an initial temperature, e.g., T=15° C. and a high humidity, e.g., RH=80%, enters the AAI inlet of the dehumidifier 902, where it undergoes dehumidification. The dehumidified AAI then exits the dehumidifier 902 as dry air 906. Because the target room temperature is the same as the AAI's initial temperature, the dehumidified AAI 906 simply flows through the cooling unit 901 without undergoing cooling and enters the room 907 with a lower humidity, e.g., RH=65%. After the dehumidified air 906 has circulated in the room 904 for a certain period, the circulated room air exits the room 904 at a higher temperature, e.g., T=27° C. but with a lower humidity level, e.g., RH=60%. The now warmer air exiting the room 804 then flows back into the dehumidifier 902. Being relatively dry at a lower humidity, e.g., RH=60%, the warm, dry air flows past the dehumidifier 902 without dehumidification and goes through the cooling unit 901, where it undergoes cooling. After being cooled, the cooled air is routed again back into the room.

Examples: The following illustrative examples are non-limiting.

Example 1. This example illustrates a method of preparation of hollow fiber membrane. A solution of 5 wt. % Nexar 9200 from Kraton Polymers in a 50:50 solution of 1-propanol and toluene was made. A bundle of hollow polypropylene membrane fibers was obtained from Tisch Scientific with different pore sizes from 0.10 to 10 microns, and with diameter from 25 to 300 mm. The bundle of fibers was placed in a molded case. As illustrated in FIG. 3, one end of the bundle was potted with epoxy and fixed to one end of the molded case, while keeping the openings of the hollow membrane fiber exposed, with the other end of the molded case was provided with elastic O-rings (for subsequent connection with source for pressurization). The Nexar solution was added to the tube, and the case was pressurized as needed to force the Nexar solution into the hollow membrane. The assembly was dried overnight.

Figure 13:
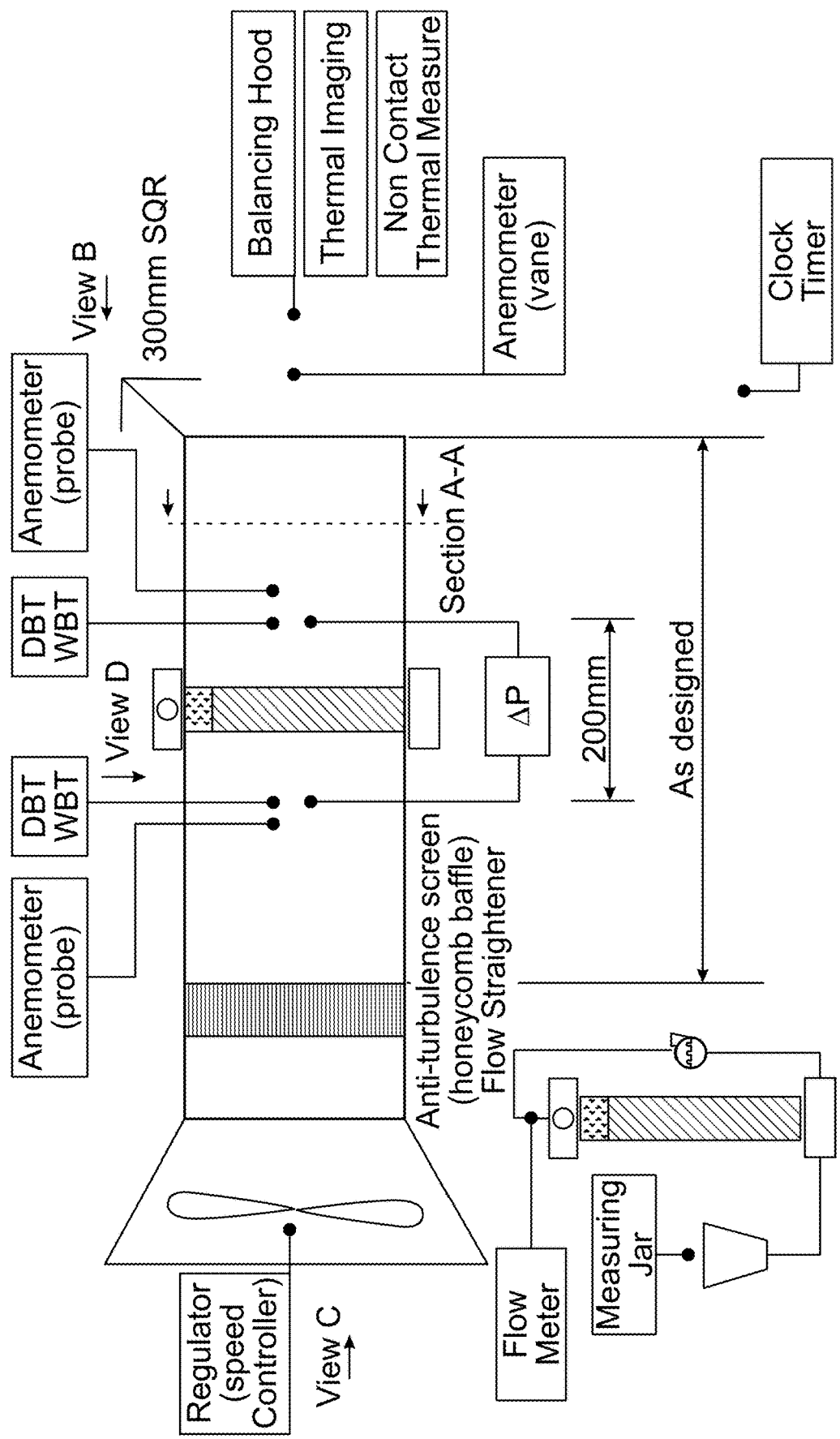
FIG. 13 is a schematic diagram of an experimental setup for assessing saturation efficiency of an evaporative cooler (for some of the examples).
Figure 14A:
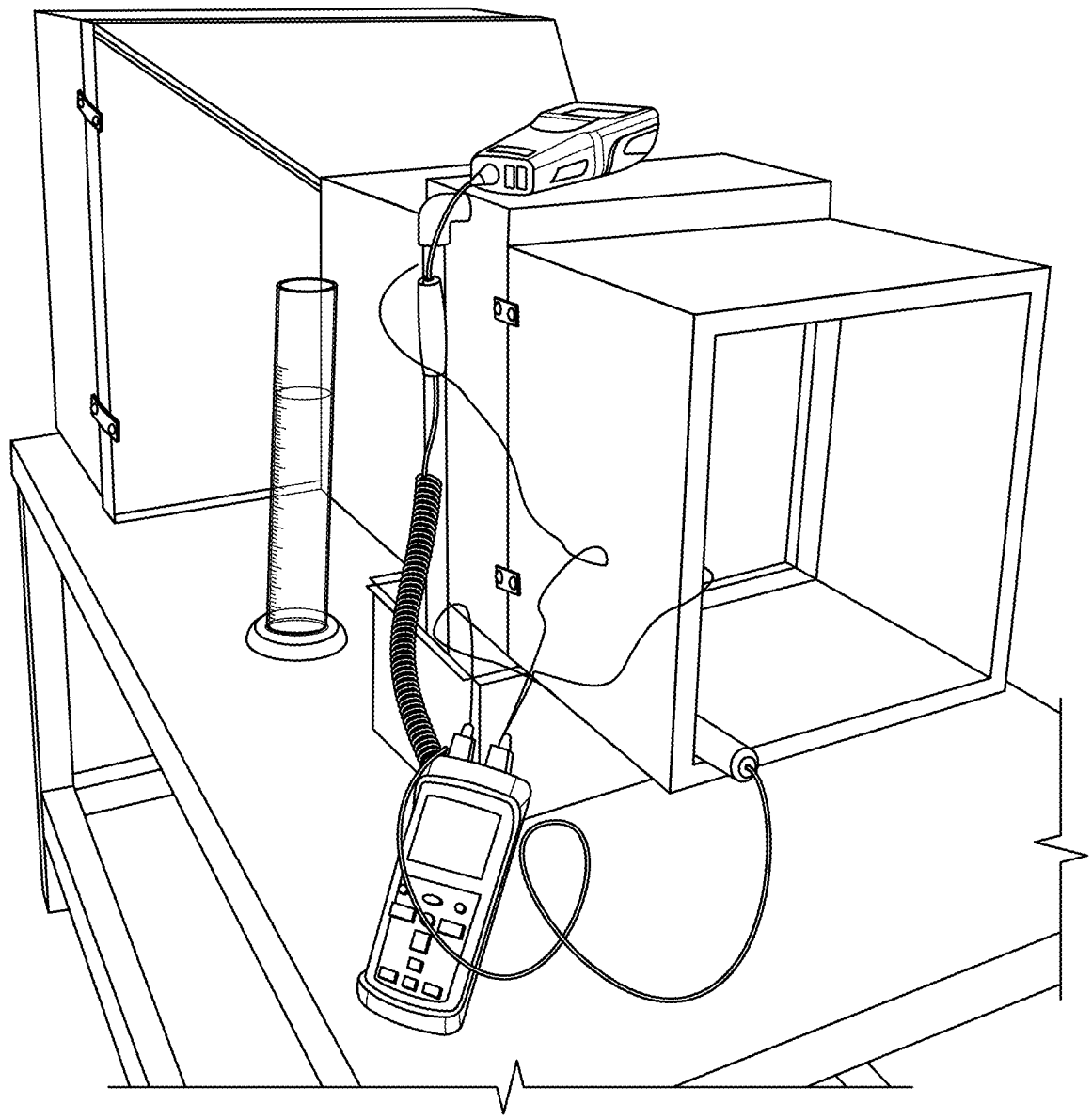
FIG. 14A is a schematic diagram of a side/rear view of a prototype of an embodiment of an air conditioning system.
Figure 14B:
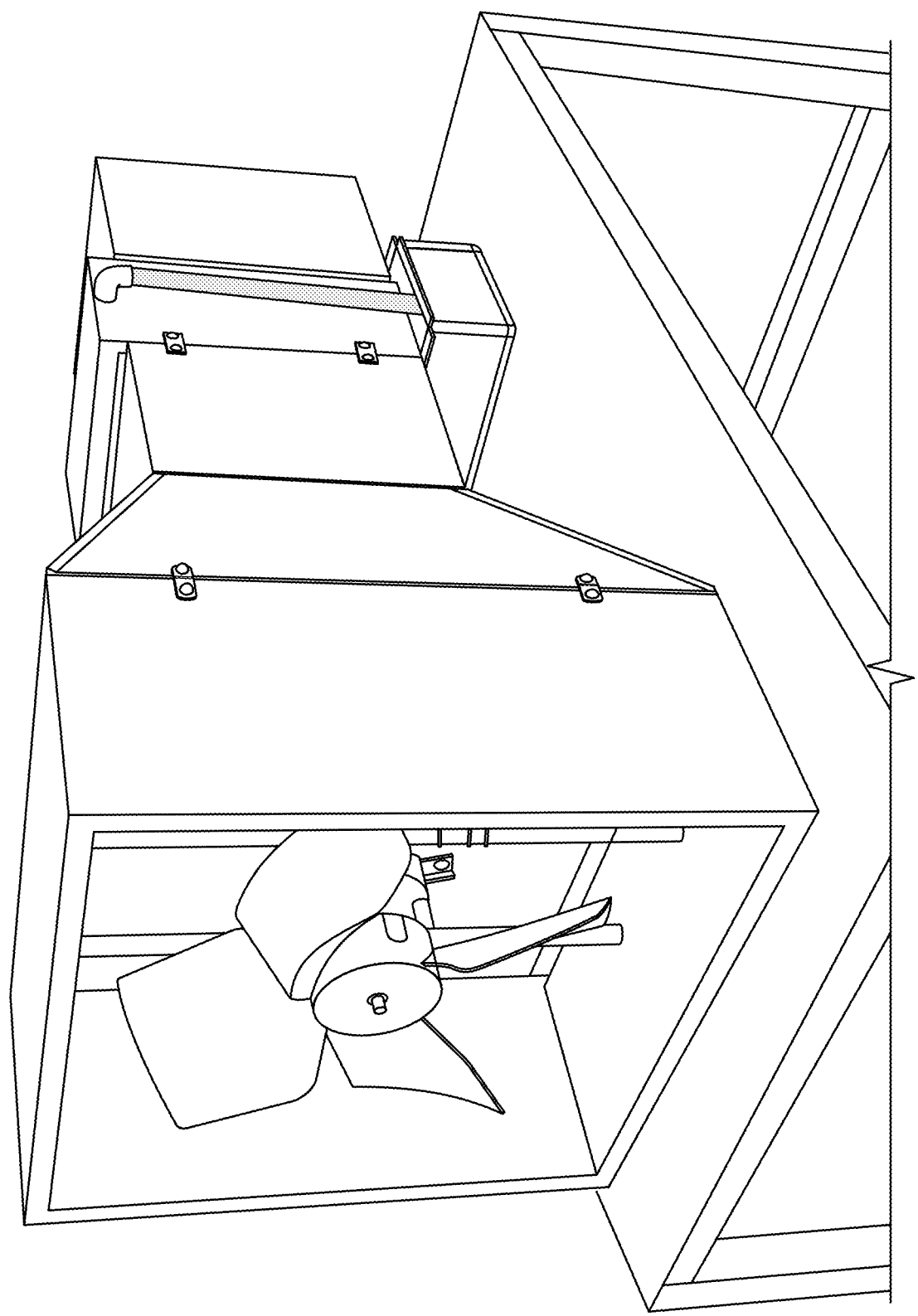
FIG. 14B is a schematic diagram of a front view of the prototype of FIG. 14A.

Example 2: Experimental results for wind tunnel variables gather during evaporative cooling efficiency of control evaporative media in relation to an identical unit yet coated with a selectively permeable membrane with ion exchange capacity. The experimental set up for generating the data is illustrated in the schematic diagram of FIG. 13. In Table 1, the fan creates air movement, with the air speed being measured by anemometer. Dry bulb temperature (DBT) and wet bulb temperature (WBT) are measured per sensors located before and after the evaporative cooler sandwiched in between. The water consumption is measured by flowmeter and confirmed by level changes in measuring jar. Pressure drop is measured across the evaporative cooler. Data obtained is used to calculate the separation efficiency as shown in Table 1. As shown, for similar pressure drop, saturation efficiency, and air velocity for different fan speed settings, the water consumption is reduced with the use of the SC membrane (Nexar 2.0 IEC). For example, going from 0.91 to 0.64 for air speed of 0.98 m/s.

TABLE 1

| Volume Flow | | Air Velocity | Saturation Efficiency | | Saturation Eff Last Fill | | Water Consumption Last Fill | | Pressure Drop | |
|---|---|---|---|---|---|---|---|---|---|---|
| | | | Ave | StDev | Ave | StDev | Ave | StDev | Ave | StDev |
| CFM | m³/s | m/s | % | % | % | % | lph | lph | Pa | Pa |
| Control evaporative pad media | | | | | | | | | | |
| 124.6 | 0.06 | 0.79 | 86.57 | 2.17 | 88.07 | 0.86 | 0.60 | 0.13 | 5.0 | 0.21 |
| 154.6 | 0.07 | 0.98 | 87.61 | 1.12 | 88.25 | 0.82 | 0.91 | 0.27 | 8.6 | 0.22 |
| 175.2 | 0.08 | 1.11 | 82.64 | 6.26 | 87.91 | 0.91 | 1.02 | 0.36 | 9.8 | 0.37 |
| Selectively water permeable membrane over control evaporative pad media | | | | | | | | | | |
| 124.0 | 0.06 | 0.80 | 85.68 | 1.62 | 87.52 | 0.94 | 0.53 | 0.13 | 6.1 | 0.24 |
| 155.3 | 0.07 | 0.98 | 83.57 | 4.86 | 87.84 | 0.74 | 0.64 | 0.19 | 8.5 | 0.27 |
| 172.0 | 0.08 | 1.09 | 85.36 | 3.39 | 87.90 | 0.56 | 0.81 | 0.25 | 10.1 | 0.45 |

Table 2 below summarizes the decrease in water consumption with saturation efficiencies as a function of air velocity. Decrease measure is a result of presence of a selectively water permeable and on exchanging membrane applied over a control evaporative cooling pad. The cooling is the same with less water.

TABLE 2

Decrease in saturation efficiency and water consumption

| Air Velocity m/s | Saturation Efficiency % | Water Consumption Liters hourly |
|---|---|---|
| 0.79 | −0.63% | −11% |
| 0.98 | −0.46% | −30% |
| 1.11 | 0.00% | −20% |

Example 3: An example was conducted to show that SC membranes with an IEC of at least at least 0.5 meq/g may be used for food refrigeration—in addition to applications in AC systems. In the example, a porous ceramic container such as a clay pot (e.g., pot-in-pot refrigerator) is coated with SC layers as thin as a few microns. The clay pot requires less water to achieve cooling and/or attaining at least 2° C. improvement in cooling compared to a clay pot with no SC coating.

Example 4: In the example, data is obtained with an MEA as the mechanism to dehumidify a static and hermetically enclosed chamber. Electrodes are provided to a chamber having a SC membrane located within, along with Rh sensors inside and outside chamber. The results demonstrate that MVTR characteristics vary according to the IEC of the SC membrane, in the context of an MEA. Table 3 shows results with a SC membrane having IEC of 2.5. Table 4 shows results data obtained from SC membrane with IEC of 1.0.

TABLE 3

| Time | Voltage | Amps | RH % | Watts |
|---|---|---|---|---|
| start | 3 | 3.43 | 53.53 | 10.29 |
| 15 min | 3 | 0.84 | 20.33 | 2.52 |
| 30 min | 3 | 0.55 | 15.75 | 1.65 |
| 45 min | 3 | 0.43 | 13.73 | 1.29 |
| 60 min | 3 | 0.38 | 13.13 | 1.14 |
| 1 hr, 15 min | 3 | 0.35 | 12.44 | 1.05 |
| 1 hr, 20 min | 3 | 0.32 | 12.38 | 0.96 |
| 1 h, 45 min | 3 | 0.31 | 10.2 | 0.93 |
| 2 hrs. | 3 | 0.31 | 9.85 | 0.93 |

TABLE 4

| Time | Voltage | Amps | RH % | Watts |
|---|---|---|---|---|
| start | 3 | 4.32 | 54.19 | 12.96 |
| 15 min | 3 | 1.2 | 31.27 | 3.6 |
| 30 min | 3 | 1.07 | 29.32 | 3.21 |
| 45 min | 3 | 1.03 | 29.63 | 3.09 |
| 60 min | 3 | 1.02 | 29.63 | 3.06 |
| 1 h, 15 min | 3 | 1.02 | 30.27 | 3.06 |
| 1 h, 20 min | 3 | 0.98 | 28.4 | 2.94 |
| 1 h, 45 min | 3 | 0.98 | 27.99 | 2.94 |
| 2 hrs. | 3 | 0.96 | 27.41 | 2.88 |

Example 6: Computer simulations were conducted to predict psychometric conditions of operation. Using MEA as moisture extraction mechanism, the dehumidifying membrane electrode assembly can maintain a relative humidity of 75% or less for air directed to the evaporative cooler, and the evaporative cooler can reduce the temperature of the water by at least 5° C., or at least 7° C., or at least 10° C. In the computer simulations, climate data from a tropical climate location was consolidated into psychometric diagrams, detailing the starting and end room environment, for a variety of starting climate conditions. In all simulations, the room air flow is 600 cfm, and the maximum ambient airflow is 1100 cfm.

Various scenarios were simulated: 1) variable discharge with dehumidifier RH (relative humidity) at exhaust is varied with constant air flow; 2) variable ambient mass flow with dehumidifier air flow with constant RH; and 3) ambient condition—room mixing with evaporator.

Figure 10:
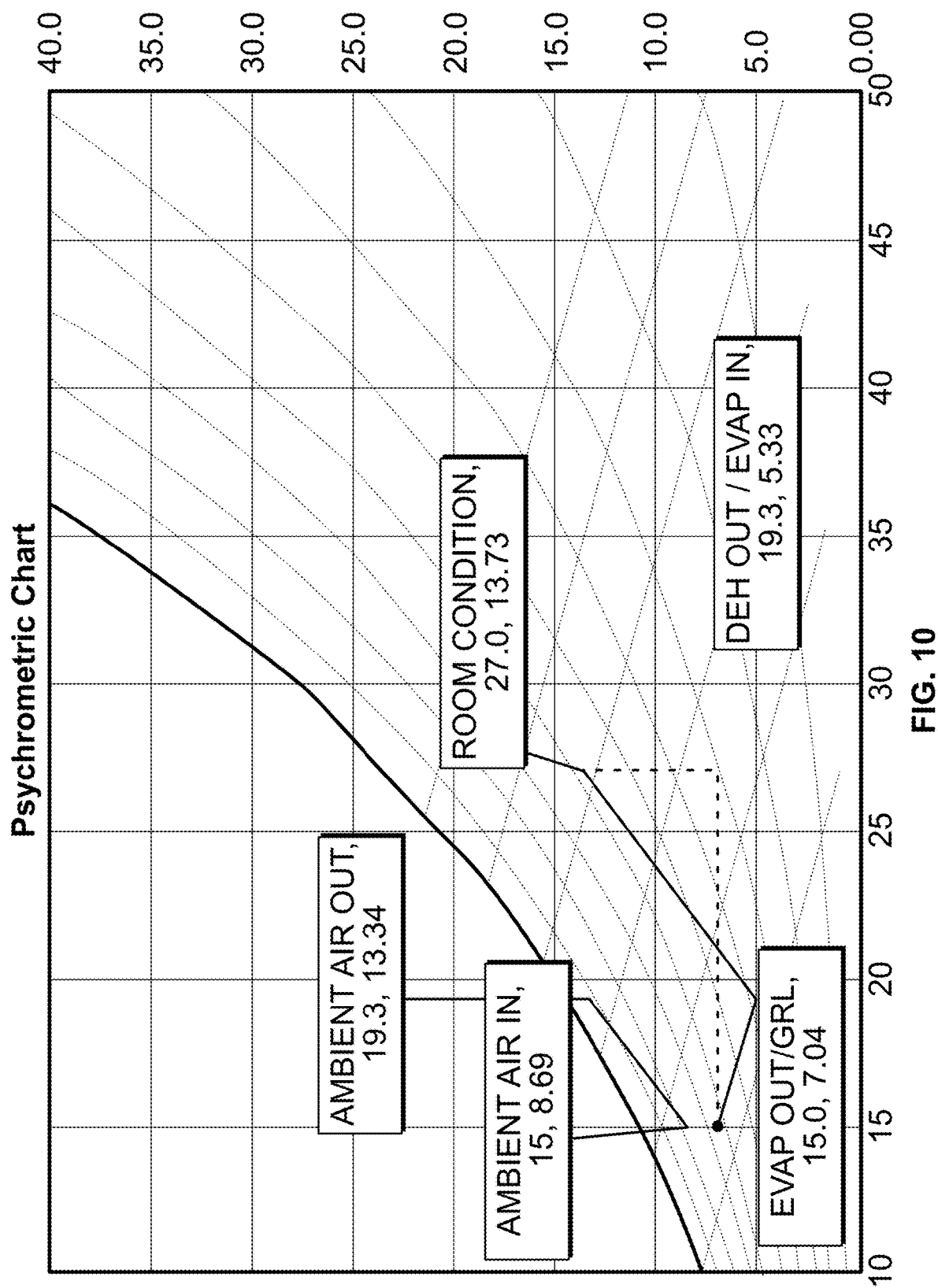
FIG. 10 is a psychometric chart of an embodiment of system shown in FIG. 9.

FIG. 10 is a psychometric chart obtained from a computer simulation of the cooling and dehumidification processes involving the air conditioning system shown in FIG. 9 based on the following set of conditions: dehumidifier exhaust RH=70%, evaporator efficiency=56%, room cycle=600 cfm, and ambient cycle=1100 cfm. Cooling load available includes SCL=13936 kJ, LCL=19003 kJ, tonnage=2.60 tons, evaporator water load=1.98 L, and dehumidifier water exhaust load=9.73 L.

The room is at T=27° C. with a humidity ratio HR=13.73. When the SC-based air conditioning system is powered on, it draws in ambient air at T=15° C. and HR=8.69, which flows through the SC-based MEA dehumidifier. After going through the dehumidification step, the air exits the dehumidifier at T=19.3° C. and HR=5.33 and goes into the next air conditioning stage, the cooling stage. After undergoing cooling, the air's temperature has decreased from T=19.3° C. to T=15° C. (the same as the ambient air inlet temperature), while the humidity has increased from HR=5.33 to HR=7.04. The cooled air is then routed into the room where it circulates and then routed towards the air conditioning unit for another round of cooling, dehumidification, or both.

Figure 11:
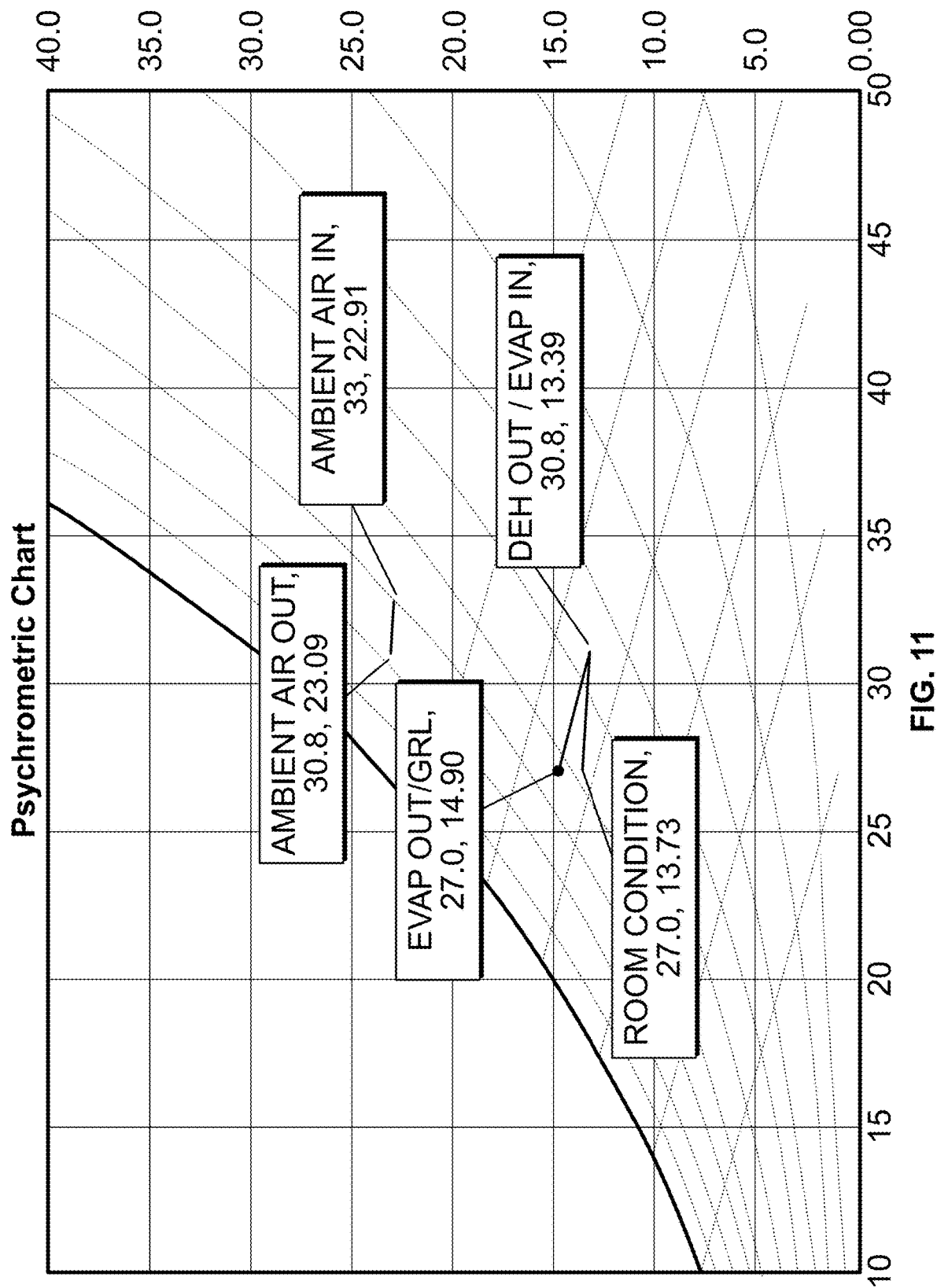
FIG. 11 is another psychometric chart corresponding to a cooling and dehumidification process illustrating conditions of the process air in different stages.

FIG. 11 is yet another psychometric chart from a computer simulation, corresponding to a cooling and dehumidification process in accordance with the membrane-based evaporative cooler and dehumidifier units, in a scenario where the external ambient conditions are warm and humid (30.8 to 33.2° C., and relative humidity of 70% to 80%). On this case, the air conditioning system operates to compensate the sensible and latent load reacting to a dehumidifier exhaust RH=65%, evaporator efficiency=44%, room cycle=600 cfm, ambient cycle=1100 cfm. Cooling load in tonnage is 0.26 tons, evaporator water load=1.75 L, and dehumidifier water exhaust=0.39 L.

The room is again initially at T=27.0° C. with HR=13.73. When the selectively permeable and ion exchanging polymer based air conditioning system is powered on, it draws in AAI at T=33° C. (warmer than the room temperature) and HR=22.91 (more humid than room air), which then flows through the selectively permeable and ion exchanging polymer based MEA dehumidifier. After going through the dehumidification step, the air exits the dehumidifier at T=30.8° C. and HR=13.39 and goes into the next air conditioning stage, the cooling stage. After undergoing cooling, the air temperature is now back to T=27.0° C. (which is identical to the room air temperature) with HR=14.90 (slightly more humid than room air). The cooled and dehumidified air then flows into the room where it circulates and routed towards the air conditioning unit for another round of either cooling, dehumidification, or both for as long as needed.

Figure 12:
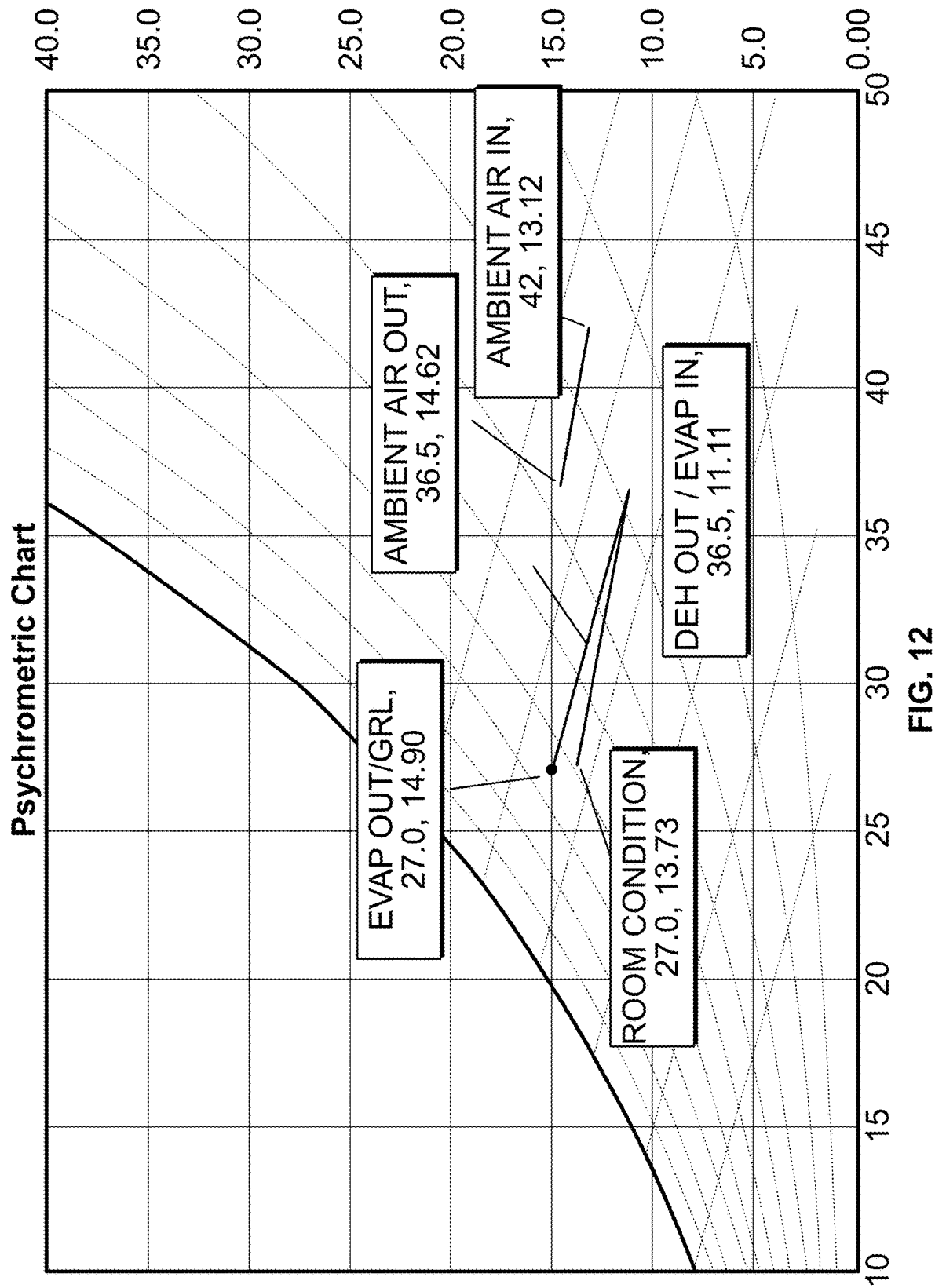
FIG. 12 is yet another psychometric chart, illustration conditions of process air in different stages of the process of cooling.

FIG. 12 is a psychometric chart illustrating an example of a scenario where the outside air is very warm (T between 36.5 and 42° C.) and dry, adding significant sensible load to the air conditioning system, which is then used exclusively for humidifying the room air from an HR=13.73 to an HR=14.9, while maintaining the room temperature at the set point of 27° C. During this process, the dehumidifier exhaust RH is approximately 47%, evaporator efficiency of 64%, room cycle of 600 cfm, ambient cycle of 1100 cfm. Cooling load available includes SCL of 0 kJ, LCL −3320 kJ, tonnage of −0.26 tons. Water load for evaporator of 4.39 L, and dehumidifier water exhaust of 3.03 L.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

The invention claimed is:

1. An air conditioning system comprising:
    a) an inlet for drawing air into the air conditioning system;
    b) a fan assembly having a plurality of fan blades for circulating air within the air conditioning system;
    c) at least one evaporative cooler unit comprising:
        an evaporative cooler media;
        a water supply for providing water to the evaporative cooler media;
    d) at least one dehumidifier unit comprising:
        a membrane assembly comprising at least one membrane comprising a selectively permeable and ion exchanging polymer;
        at least one of:
        i) a pair of electrodes positioned at two opposite sides of the at least one membrane, in combination with a power source for generating a voltage across the electrodes;
        ii) an air tight chamber in contact with the at least membrane, the air tight chamber is connected to a vacuum source to enable moisture extraction from the at least membrane in contact with the air tight chamber;
    e) an outlet for returning air from the air conditioning system;
    wherein the at least one dehumidifier unit and at least one evaporative cooler unit are operated and controlled independently of each other;
    wherein the selectively permeable and ion exchanging polymer is a sulfonated copolymer having ion exchange capacity of at least 0.5 meq/g.

2. The air conditioning system of claim 1, wherein the membrane assembly comprises a plurality of membranes as hollow fiber membranes each having a hollow core, wherein the outside of the hollow fiber membranes is coated with the selectively permeable and ion exchanging polymer, and wherein the hollow cores of the hollow fiber membranes are connected to the vacuum source, enabling moisture extraction from the fiber membranes.

3. The air conditioning system of claim 1, wherein the membrane assembly comprises a plurality of membranes arranged in a frame-and-plate assembly, having alternating process air channels and vacuum chambers in between with the membranes each being supported on a support frame, wherein the alternating vacuum chambers are interconnected with the vacuum source, enabling moisture extraction from the membranes, and wherein the selectively permeable and ion exchanging polymer are coated or laminated onto the support frame.

4. The air conditioning system of claim 1, wherein the sulfonated copolymer is selectively sulfonated to contain from 10-100 mol % sulfonic acid or sulfonate salt functional groups based on the number of sulfonatable monomer units in the sulfonated copolymer.

5. The air conditioning system of claim 1, wherein the sulfonated copolymer is selected from the group consisting of perfluorosulfonic acid polymers, polystyrene sulfonates, sulfonated block copolymers, polysulfones, polyketones, and mixtures thereof.

6. The air conditioning system of claim 1, wherein the sulfonated copolymer is a sulfonated tetrafluoroethylene copolymer having a polytetrafluoroethylene (PTFE) backbone and side chains of vinyl ethers terminating in sulfonic acid groups in a cluster region.

7. The air conditioning system of claim 1, further comprising the pair of electrodes positioned at two opposite sides of each membrane, and the power source for generating a voltage across the electrodes.

8. The air conditioning system of claim 1, wherein the evaporative cooler media comprises a selectively permeable and ion exchanging polymer, and wherein the selectively permeable and ion exchanging polymer is coated on the plurality of fan blades.

9. The air conditioning system of claim 1, wherein the evaporative cooler media comprises a selectively permeable and ion exchanging polymer membrane, and wherein the selectively permeable and ion exchanging polymer membrane is stretched across the plurality of fan blades.

10. The air conditioning system of claim 1, wherein the evaporative cooler media comprises a selectively permeable and ion exchanging polymer membrane.

11. The air conditioning system of claim 1, wherein the membrane comprising a selectively permeable and ion exchanging polymer comprises a sulfonated block copolymer film having a thickness of between about 5 micron to about 500 microns.

12. The air conditioning system of claim 1, wherein the sulfonated copolymer is a sulfonated block copolymer having a sulfonation degree of at least 25 mol %.

13. An air conditioning system comprising,
    a) an inlet for drawing air into the air conditioning system;
    b) a fan assembly having a plurality of fan blades for circulating air within the air conditioning system;
    c) at least one evaporative cooler unit comprising:
        an evaporative cooler media;
        a water supply for providing water to the evaporative cooler media;
    d) at least one dehumidifier unit comprising:
        a membrane assembly comprising at least one membrane comprising a selectively permeable and ion exchanging polymer;
        at least one of:
        i) a pair of electrodes positioned at two opposite sides of the at least one membrane, in combination with a power source for generating a voltage across the electrodes;
        ii) an air tight chamber in contact with the at least membrane, the air tight chamber is connected to a vacuum source to enable moisture extraction from the at least membrane in contact with the air tight chamber;
    e) an outlet for returning air from the air conditioning system;
    wherein the selectively permeable and ion exchanging polymer is a sulfonated block copolymer having ion exchange capacity of at least 0.5 meq/g;
    wherein the sulfonated block copolymer comprises a configuration corresponding to at least one of A-B-D-B-A, A-D-B-D-A, $(A-D-B)_n A$, $(A-B-D)_n A$, $(A-B-D)_n X$, and $(A-B-D)_n X$, wherein:

the A-block contains essentially no sulfonic acid or sulfonate ester functional groups and is selected from one or more of polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;

the B-block contains from about 10 to about 100 mol percent sulfonic acid or sulfonate ester functional groups based on the number of monomer units and comprises segments of one or more polymerized vinyl aromatic monomers;

the block D comprises a hydrogenated polymer or copolymer of a conjugated diene selected from isoprene, 1,3-butadiene and mixtures thereof;

n is an integer from 2 to about 30, and

X is a coupling agent residue.

14. The air conditioning system of claim 1, wherein the fan assembly comprises a nozzle in one or more of the fan blades through which water from a water reservoir flows, and wherein a mist of water is generated as the plurality of fan blades rotate.

15. The air conditioning system of claim 1, wherein air from an enclosed space enters the air conditioning system via the dehumidifier air inlet or the evaporative cooler air inlet.

16. An air conditioning system comprising:
(a) at least one dehumidifier unit comprising:
a dehumidifier air intake;
a membrane electrode assembly comprising:
a dehumidifier membrane comprising a sulfonated copolymer;
a pair of electrodes positioned at two opposite sides of the membrane;
a power source for generating a voltage across the pair of electrodes; and
a dehumidified air return; and
(b) at least one evaporative cooler unit comprising:
an evaporative cooler air intake;
at least one evaporative cooler membrane comprising a sulfonated block copolymer;
a water source for providing water to the evaporative cooler membrane;
at least one fan for facilitating a flow of air from the air intake towards the at least one evaporative cooler membrane, wherein the air from the evaporative cooler air intake is cooled via water evaporation from the at least one evaporative cooler membrane; and
a cooled air return;
wherein the at least one dehumidifier unit and at least one evaporative cooler unit are operated and controlled independently of each other;
wherein the sulfonated copolymer used in either or both of the at least one dehumidifier unit and the at least one cooler unit has an ionic exchange capacity of at least 0.5 meq/g and a sulfonation degree of at least 25 mol %.

17. An air conditioning system comprising:
at least one dehumidifier unit comprising:
a dehumidifier air intake;
a membrane assembly comprising:
at least a membrane comprising a sulfonated block copolymer;
an air tight chamber in contact with the at least membrane, the air tight chamber is connected to a vacuum source to enable moisture extraction from the at least membrane; and
a dehumidified air return; and
at least one evaporator cooler unit comprising:
an evaporator cooler air intake;
at least an evaporator cooling pad comprising a sulfonated copolymer membrane;
a water source for providing water to the evaporator cooling pad;
at least one fan for facilitating a flow of air from the air intake towards the at least an evaporator cooling pad, wherein the air from the air intake is cooled via water evaporation from the at least one evaporator cooling pad; and
an evaporator cooler air return;
wherein the at least one dehumidifier unit and at least one evaporative cooler unit are operated and controlled independently of each other;
wherein the sulfonated copolymer used in one or both of the at least one dehumidifier unit and the at least one cooler unit has an ionic exchange capacity of at least 0.5 meq/g, a sulfonation degree of at least 25 mol %, and a thickness of between about 5 micron to about 500 microns.

18. An air conditioning system comprising:
at least one dehumidifier unit comprising:
a dehumidifier air intake;
a membrane assembly comprising:
at least a membrane comprising a sulfonated block copolymer;
an air tight chamber in contact with the at least membrane, the air tight chamber is connected to a vacuum source to enable moisture extraction from the at least membrane; and
a dehumidified air return; and
at least one evaporator cooler unit comprising:
an evaporator cooler air intake;
at least an evaporator cooling pad comprising a sulfonated copolymer membrane;
a water source for providing water to the evaporator cooling pad;
at least one fan for facilitating a flow of air from the air intake towards the at least an evaporator cooling pad, wherein the air from the air intake is cooled via water evaporation from the at least one evaporator cooling pad; and
an evaporator cooler air return;
wherein the sulfonated block copolymer used in one or both of the at least one dehumidifier unit and the at least one cooler unit has an ionic exchange capacity of at least 0.5 meq/g, a sulfonation degree of at least 25 mol %, and a thickness of between about 5 micron to about 500 microns;
wherein the sulfonated block copolymer comprises a configuration corresponding to at least one of A-B-D-B-A, A-D-B-D-A, $(A-D-B)_nA$, $(A-B-D)_nA$, $(A-B-D)_nX$, and $(A-D-B)_nX$, wherein:
the A-block contains essentially no sulfonic acid or sulfonate ester functional groups and is selected from one or more of polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof;

the B-block contains from about 10 to about 100 mol percent sulfonic acid or sulfonate ester functional groups based on the number of monomer units and comprises segments of one or more polymerized vinyl aromatic monomers;

the block D comprises a hydrogenated polymer or copolymer of a conjugated diene selected from isoprene, 1,3-butadiene and mixtures thereof;

n is an integer from 2 to about 30, and

X is a coupling agent residue.

* * * * *